(12) United States Patent
Yabuuchi et al.

(10) Patent No.: US 8,253,286 B2
(45) Date of Patent: Aug. 28, 2012

(54) MOTOR WITH COMING-OFF PREVENTING PORTION

(75) Inventors: Yuji Yabuuchi, Kyoto (JP); Jumpei Kitamura, Kyoto (JP); Atsushi Morita, Kyoto (JP); Hiroyoshi Teshima, Kyoto (JP); Takuya Teramoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 273 days.

(21) Appl. No.: 12/719,896

(22) Filed: Mar. 9, 2010

(65) Prior Publication Data
US 2010/0232993 A1 Sep. 16, 2010

(30) Foreign Application Priority Data

Mar. 12, 2009 (JP) .................................. 2009-060125
Feb. 12, 2010 (JP) .................................. 2010-028499

(51) Int. Cl.
*H02K 7/00* (2006.01)
(52) U.S. Cl. ............................ 310/67 R; 310/91; 310/51
(58) Field of Classification Search ................ 310/67 R, 310/91, 51
See application file for complete search history.

(56) References Cited

U.S. PATENT DOCUMENTS

| 5,610,462 | A | 3/1997 | Takahashi | |
|---|---|---|---|---|
| 6,531,796 | B1 * | 3/2003 | Konno | 310/67 R |
| 6,544,011 | B2 * | 4/2003 | Hsieh | 417/423.7 |
| 7,420,304 | B2 * | 9/2008 | Sugiyama et al. | 310/90 |
| 7,498,704 | B2 * | 3/2009 | Otsuki et al. | 310/90.5 |
| 7,567,000 | B2 * | 7/2009 | Sugiyama et al. | 310/64 |
| 7,876,005 | B2 * | 1/2011 | Ichizaki | 310/67 R |
| 8,092,195 | B2 * | 1/2012 | Muraoka et al. | 417/354 |
| 2002/0030926 | A1 * | 3/2002 | Teshima | 360/99.08 |
| 2005/0278938 | A1 * | 12/2005 | Harada | 29/598 |
| 2006/0181174 | A1 * | 8/2006 | Liu | 310/217 |
| 2006/0255668 | A1 * | 11/2006 | Chen et al. | 310/67 R |
| 2007/0120433 | A1 * | 5/2007 | Sugiyama et al. | 310/90 |
| 2007/0133123 | A1 * | 6/2007 | Ichizaki | 360/99.05 |
| 2007/0176504 | A1 * | 8/2007 | Otsuki et al. | 310/90.5 |
| 2007/0188034 | A1 * | 8/2007 | Yoshida | 310/90 |
| 2007/0200465 | A1 * | 8/2007 | Shiga | 310/67 R |
| 2007/0286726 | A1 * | 12/2007 | Yabuuchi | 415/220 |
| 2009/0001825 | A1 * | 1/2009 | Hanaoka et al. | 310/42 |

FOREIGN PATENT DOCUMENTS

| CN | 101013831 | A | | 8/2007 |
|---|---|---|---|---|
| JP | 06-253482 | A | | 9/1994 |
| JP | 10-014150 | A | | 1/1998 |
| JP | 2003-047222 | A | | 2/2003 |
| JP | 2006074864 | A | * | 3/2006 |

* cited by examiner

*Primary Examiner* — Quyen Leung
*Assistant Examiner* — Alex W Mok
(74) *Attorney, Agent, or Firm* — Keating & Bennett, LLP

(57) ABSTRACT

A motor includes a coming-off preventing portion including an inner circumferential edge defining a through hole, inside which a substantially cylindrical bearing housing is inserted, and being arranged axially above an insulator. The inner circumferential edge has at least two different radial dimensions. A boss portion includes a columnar portion inserted inside the through hole, and a collar portion extending radially outward from a lower end of the columnar portion. The collar portion includes an outside surface having at least two different radial dimensions, and an upper surface arranged axially opposite a bottom portion of the inner circumferential edge. The radial dimensions of the inner circumferential edge and those of the collar portion are arranged to allow the collar portion to be axially inserted through the inner circumferential edge only when the inner circumferential edge and the collar portion are arranged in a predetermined circumferential orientation relative to each other.

20 Claims, 22 Drawing Sheets

MOTOR WITH COMING-OFF PREVENTING PORTION

BACKGROUND OF THE INVENTION

1. Field of the Invention

The present invention relates to a motor including an insulator.

2. Description of the Related Art

In general, motors include a rotor and a stator. The stator is typically attached to a cylindrical bearing housing containing a bearing. The stator typically includes a stator core and an insulator attached to the stator core.

The rotor is arranged to rotate relative to the stator. The rotor typically includes a boss portion and a shaft having one end fixed to the boss portion. The shaft is inserted inside the bearing housing, and rotatably supported by the bearing.

For example, a motor described in JP-A 2003-47222 has a mechanism to prevent the shaft from coming off the bearing housing.

In such a conventional motor, however, when viewed in an axial direction, both an inner circumferential surface of the insulator and an outside surface of a cylindrical intruding portion are in the shape of a circle having a single radius. Therefore, upon application of a shock or the like from outside, a stopper portion and the cylindrical intruding portion may be forced out of engagement with each other such that the shaft comes off the bearing or the insulator regardless of relative circumferential orientations of the cylindrical intruding portion and the stopper portion.

SUMMARY OF THE INVENTION

According to a preferred embodiment of the present invention, a motor includes a base portion; a substantially cylindrical bearing housing extending from the base portion along a specified axis; an insulator attached to an axially upper end portion of the bearing housing; a coming-off preventing portion including a through hole and arranged axially above the insulator; a shaft arranged to pass through the through hole and be inserted inside the bearing housing; and a boss portion including a columnar portion and a collar portion, the columnar portion being arranged to retain one end of the shaft and inserted inside the through hole, the collar portion extending radially outward from a lower end of the columnar portion. The coming-off preventing portion preferably includes an inner circumferential edge defining the through hole, the inner circumferential edge including at least two different radial dimensions. The collar portion preferably includes an outside surface including at least two different radial dimensions, and an upper surface arranged axially opposite a bottom portion of the inner circumferential edge. The at least two different radial dimensions of the inner circumferential edge and the at least two different radial dimensions of the collar portion are arranged to allow the collar portion to be axially inserted through the inner circumferential edge with application of a slight force when the inner circumferential edge and the collar portion are arranged in a predetermined circumferential orientation relative to each other.

According to a preferred embodiment of the present invention, a shaft is prevented from easily coming off a bearing housing due to a shock, force or the like.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the accompanying drawings. Note that the present invention is not limited to the preferred embodiments described below. Also note that variations and modifications can be made appropriately as long as desired effects of the present invention are not impaired. Also note that the preferred embodiments may be combined with other embodiments of the present invention.

In the following description, with respect to directions along a central axis J1, an upper side and a lower side of the figures will be simply referred to as an upper side and a lower side, respectively. The terms "upper", "lower", "above", "below", "upward", "downward", and so on are not necessarily used in reference to the direction of gravity.

Figure 1:
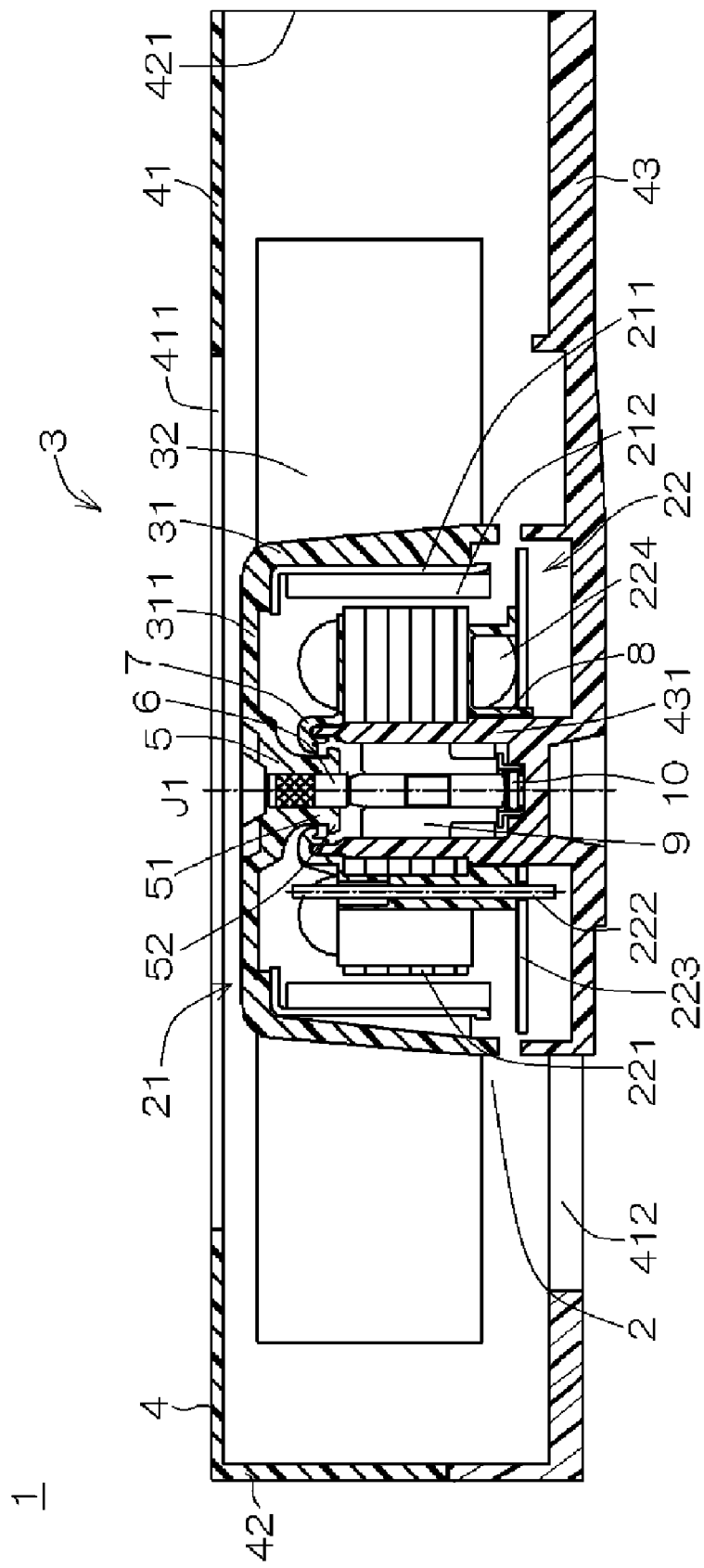
FIG. 1 is a cross-sectional view of a centrifugal fan according to a first preferred embodiment of the present invention.

FIG. 1 is a cross-sectional view of a centrifugal fan 1 according to a first preferred embodiment of the present invention. The centrifugal fan 1 includes a motor 2 arranged to rotate an impeller 3 about the central axis J1.

A housing 4 is preferably a case including a housing cover 41, a side wall portion 42, and a base portion 43. The motor 2 and the impeller 3 are contained in an interior of the housing 4.

The housing cover 41 has an inlet 411 passing therethrough in an axial direction.

The base portion 43 is a substantially flat member having a plurality of inlets 412 passing therethrough in the axial direction and preferably arranged at regular intervals in a circumferential direction. The base portion 43 has provided thereon a substantially cylindrical bearing housing 431 extending along the central axis J1.

The side wall portion 42 is arranged to join the housing cover 41 and the base portion 43 to each other, and to surround the circumference of the motor 2 and the impeller 3. The side wall portion 42 has an outlet 421 passing therethrough in a radial direction.

Once the motor 2 is driven to rotate the impeller 3, air enters into the interior of the housing 4 through the inlets 411 and 412, and is then sent out of the housing 4 through the outlet 421.

The impeller 3 preferably includes an impeller cup 31 and a plurality of blades 32. The impeller cup 31 is a substantially cylindrical member including a substantially circular cover portion 311. The blades 32 are preferably arranged at regular intervals in the circumferential direction on an outside surface of the impeller cup 31. The impeller cup 31 and the blades 32 are preferably integral with each other and provided by, for example, injection molding a resin material.

A substantially cylindrical boss portion 5 is arranged at the center of the cover portion 311 to extend downward in the axial direction. The boss portion 5 is arranged to retain one end of a substantially columnar shaft 6.

The motor 2 includes a rotor portion 21 and a stator portion 22. The rotor portion 21 is arranged to rotate about the central axis J1 with respect to the stator portion 22.

The rotor portion 21 includes a rotor holder 211 and a rotor magnet 212.

The rotor holder 211 is a substantially cylindrical member made of a magnetic material (e.g., a metal such as stainless steel). The rotor holder 211 is attached to an inside surface of the impeller cup 31. The rotor portion 21 is thus arranged to rotate together with the impeller 3.

The rotor magnet 212 is substantially in the shape of a cylinder, and arranged on an inside surface of the rotor holder 211. The rotor magnet 212 is polarized to have a plurality of magnetic poles arranged in the circumferential direction of the rotor magnet 212.

The stator portion 22 includes first and second insulators 7 and 8, a stator core 221, a conductive pin 222, a circuit board 223, and coils 224.

The stator core 221 preferably includes a substantially cylindrical core back and a plurality of teeth arranged on an outside surface of the core back to protrude radially outward. The core back has a through hole in which the bearing housing 431 is inserted. The teeth are radially opposed to the rotor magnet 212.

The first and second insulators 7 and 8 are preferably attached to the stator core 221 from above and below, respectively, in the axial direction. The first and second insulators 7 and 8 are made of an insulating material such as, for example, a resin material. Note that the material of the first and second insulators 7 and 8 may also be any other desirable insulating material, and is not limited to resin materials.

Each coil 224 is wound on the stator core 221 with the first and second insulators 7 and 8 intervening therebetween. One end of the coil 224 is connected to the conductive pin 222, which is made of a conductive material, such as metal or the like.

The circuit board 223 is attached to the bearing housing 431, and is electrically connected to the coils 224 through the conductive pin 222.

Once a current is supplied from an external power supply to the coils 224 through the circuit board 223 and the conductive pin 222, magnetic flux is generated about each coil 224 and the stator core 221. This magnetic flux produces a magnetic interaction with magnetic flux generated by the rotor magnet 212, so that the rotor portion 21 is rotated relative to the stator portion 22.

A sleeve 9 and a thrust bearing 10 are arranged in an interior of the bearing housing 431. The sleeve 9 is preferably a member made of sintered metal, for example, and is arranged to support the shaft 6 via a lubricating fluid such that the shaft 6 is rotatable. Note that any other desirable bearing device may be used to support the shaft 6. For example, a ball bearing may be used instead of the sleeve 9, in other preferred embodiments.

Figure 2:
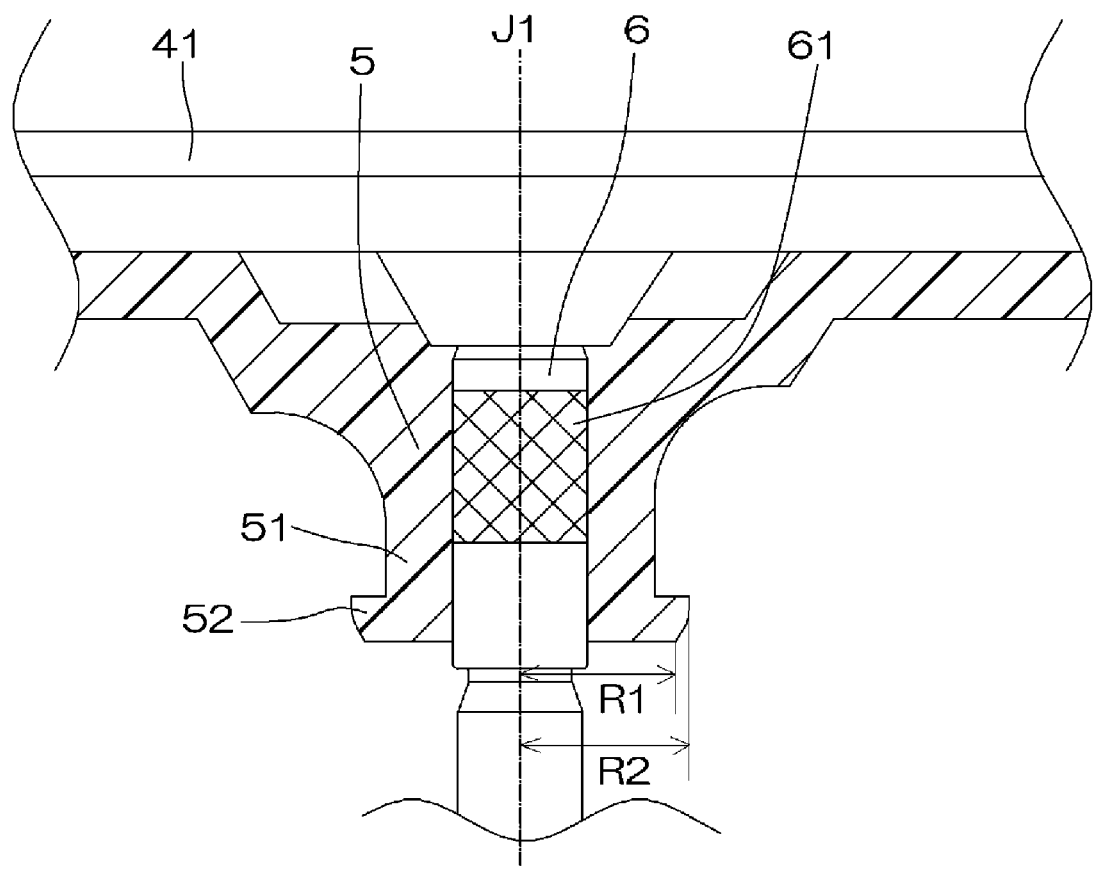
FIG. 2 is a partial enlarged view of a boss portion and a shaft according to the first preferred embodiment of the present invention.
Figure 3:
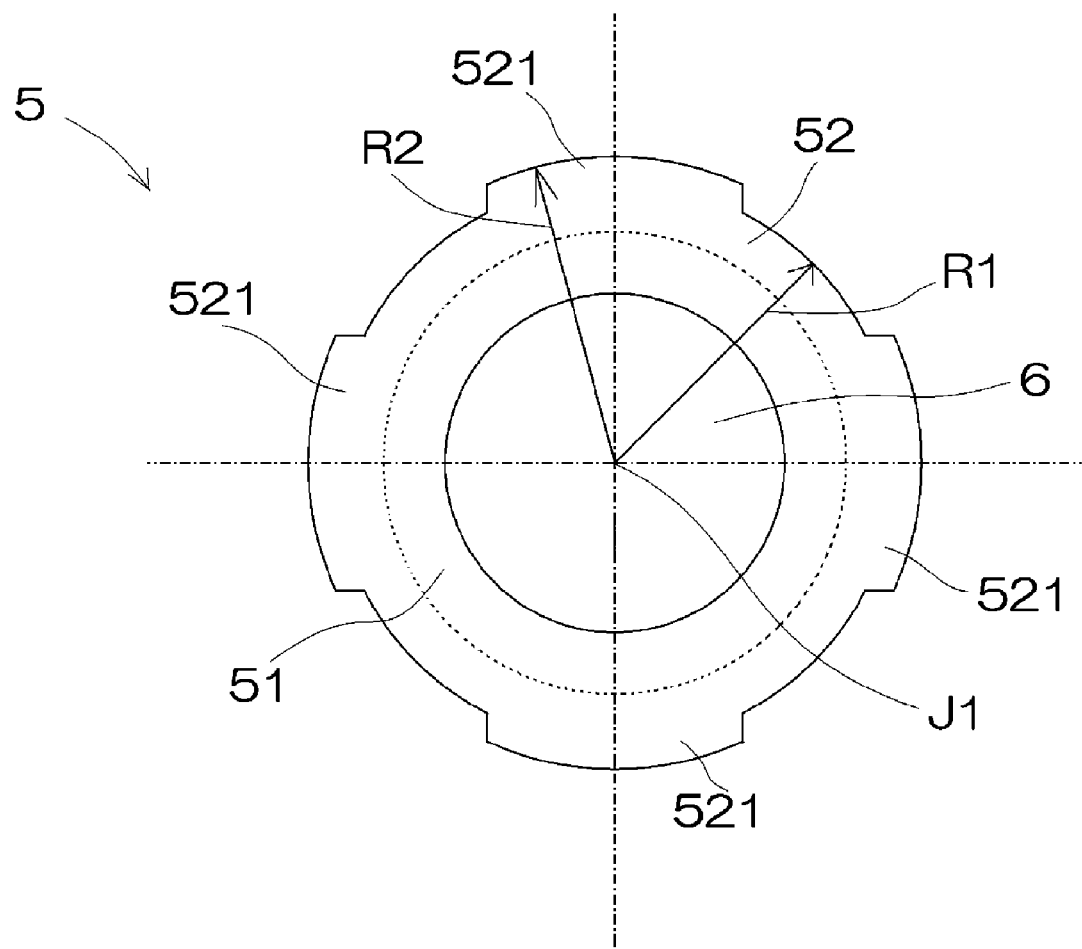
FIG. 3 is a cross-sectional view of the boss portion and the shaft according to the first preferred embodiment of the present invention, taken along a plane substantially perpendicular to a central axis.

FIG. 2 is a partial enlarged view of the boss portion 5 and the shaft 6. FIG. 3 is a cross-sectional view of the boss portion 5 and the shaft 6 taken along a plane substantially perpendicular to the central axis J1.

As illustrated in FIGS. 2 and 3, the boss portion 5 includes a columnar portion 51 and a collar portion 52. The columnar portion 51 is arranged to retain one end of the shaft 6 and to be inserted inside a through hole 75 (shown in FIG. 4). An axially lower end of the columnar portion 51 is preferably flat. The collar portion 52 extends radially outward from a lower end of the columnar portion 51. The shaft 6 preferably has a roughened portion 61 on an outer surface thereof. When the shaft 6 and the impeller cup 31 including the boss portion 5 are formed integrally by injection molding, for example, a molten resin enters into the roughened portion 61. The molten resin is hardened after cooling. As a result, the shaft 6 is securely fixed to the columnar portion 51.

The roughened portion 61 can be formed by knurling, cutting, or the like, for example.

As illustrated in FIGS. 2 and 3, the columnar portion 51 has the collar portion 52 arranged on an outside surface thereof to extend radially outward. A plurality of (for example, four, in the present preferred embodiment) projecting portions 521, which project radially outward, are arranged at regular intervals in the circumferential direction on an outside surface of the collar portion 52.

As illustrated in FIG. 3, the collar portion 52 has a fixed radius R1 except where the projecting portions 521 are arranged. Here, the term "radius" refers to the radial distance from the central axis J1 to the outside circumferential surface of the collar portion 52. Meanwhile, where the projecting portions 521 are arranged, the collar portion 52 has a fixed radius R2 greater than the radius R1. In other words, the outside surface of the collar portion 52 has two types of circular arc portions, one with the radius R1 and the other with the radius R2.

In addition, as illustrated in FIG. 2, the outside surface of the collar portion 52 including the projecting portions 521 is preferably curved such that the diameter thereof gradually decreases in an axially downward direction.

Figure 4:
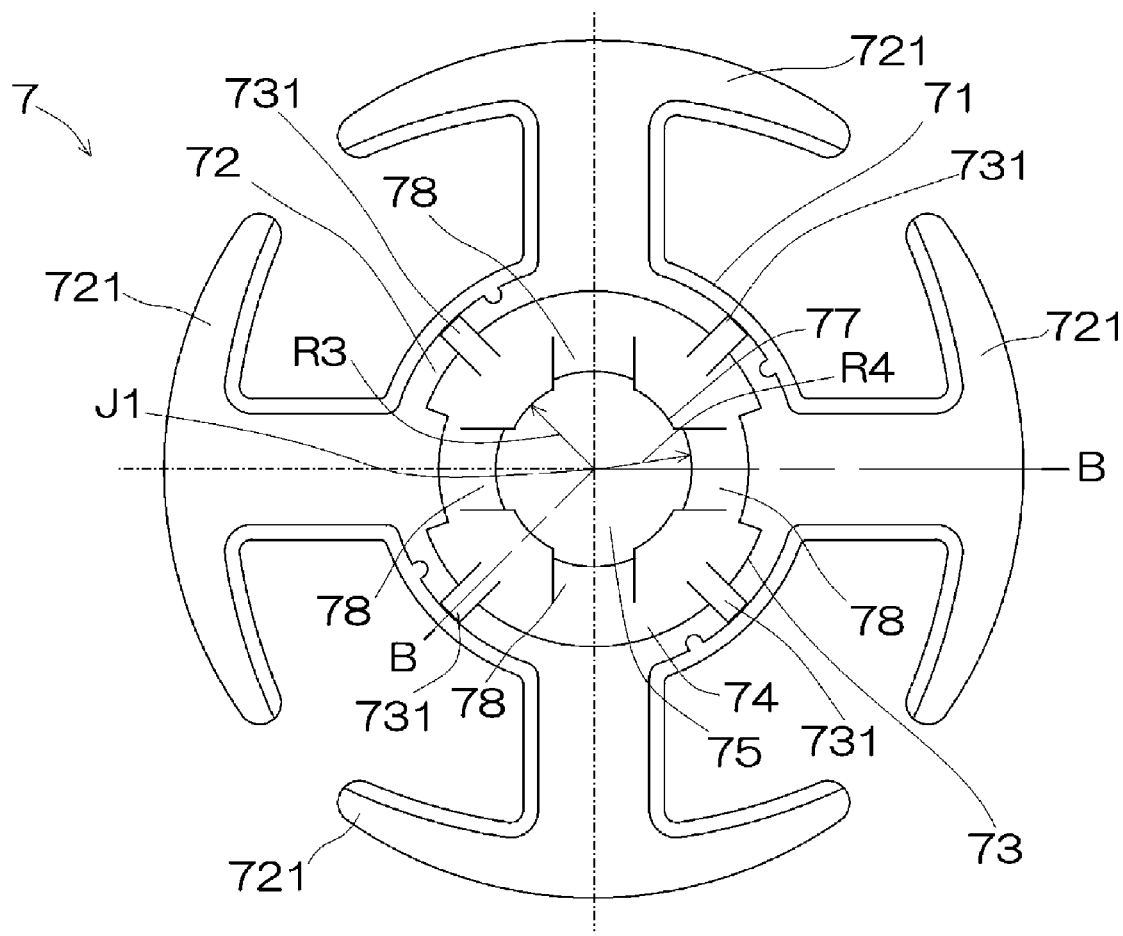
FIG. 4 is a plan view of a first insulator according to the first preferred embodiment of the present invention, as viewed from above in an axial direction.
Figure 5:
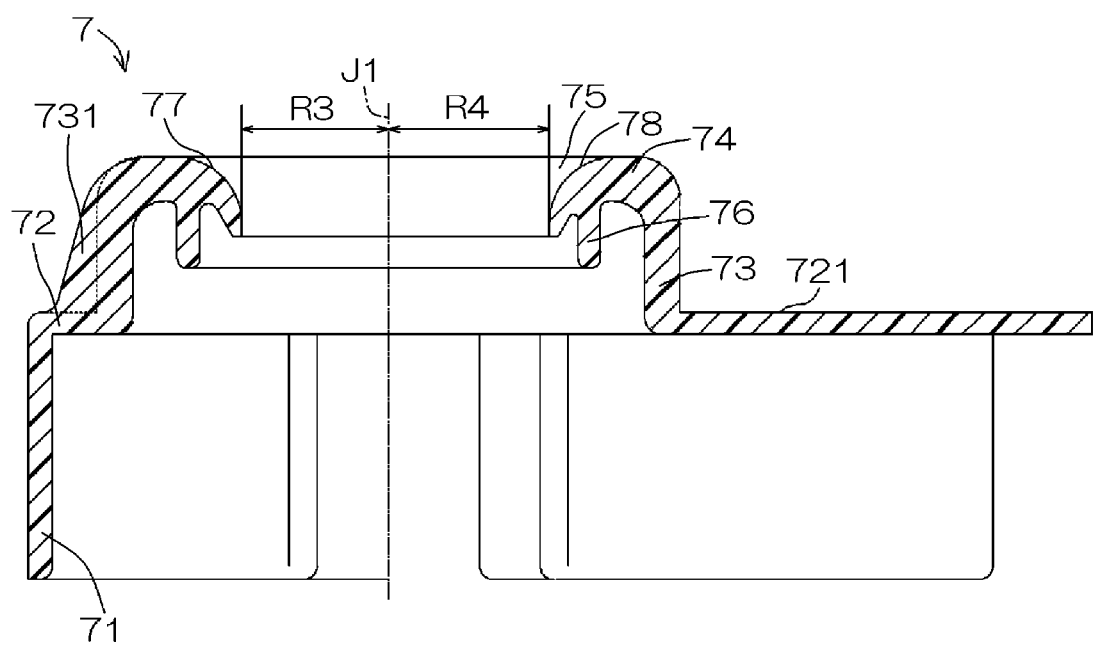
FIG. 5 is a partial cross-sectional view of the first insulator according to the first preferred embodiment of the present invention.
Figure 6:
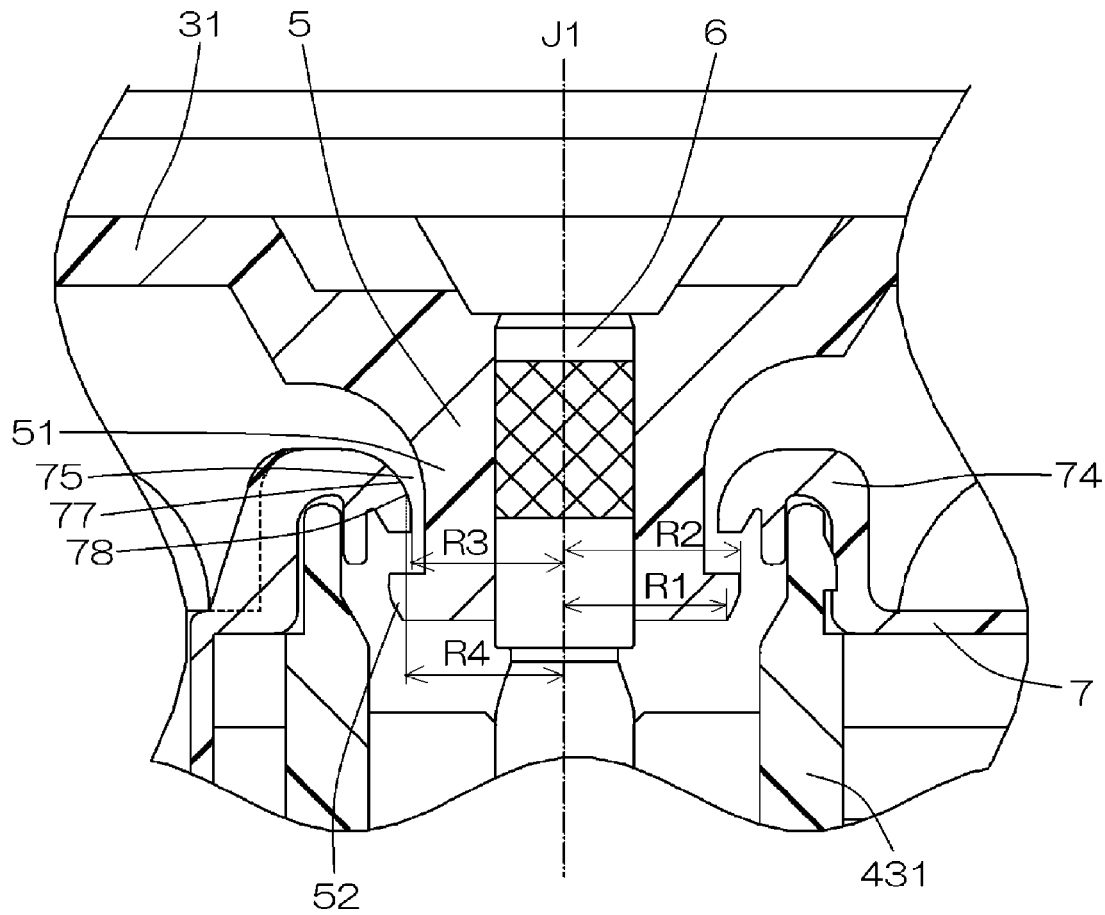
FIG. 6 is an enlarged cross-sectional view of the boss portion and its neighborhood according to the first preferred embodiment of the present invention.

FIG. 4 is a plan view of the first insulator 7 as viewed from above in the axial direction. FIG. 5 is a cross-sectional view of the first insulator 7 taken along line B-J1-B of FIG. 4. FIG. 6 is an enlarged cross-sectional view of the boss portion 5 and its neighborhood as illustrated in FIG. 1.

As illustrated in FIGS. 4 and 5, the first insulator 7 includes a first cylindrical portion 71 and a first annular portion 72. The first cylindrical portion 71 is radially opposed to the outside surface of the core back of the stator core 221. The first annular portion 72 is substantially annular and extends radially inward from an axially upper end of the first cylindrical portion 71. When the motor 2 has been assembled, an axially lower surface of the first cylindrical portion 71 is in contact with an axially upper end surface of the core back of the stator core 221.

A plurality of (for example, four, in the present preferred embodiment) tooth portions 721 are arranged to extend radially outward from an end of the first annular portion 72. The tooth portions 721 are arranged to be axially opposed the teeth of the stator core 221.

The first insulator 7 further includes a second cylindrical portion 73 and a second annular portion 74. The second cylindrical portion 73 extends axially upward from an inner circumferential edge of the first annular portion 72. The second annular portion 74 is substantially annular and arranged on an axially upper end of the second cylindrical portion 73. A plurality of (for example, four, in the present preferred embodiment) ribs 731 are arranged on an outside surface of the second cylindrical portion 73. A through hole 75 is defined in a substantial center of the second annular portion 74. In addition, the second annular portion 74 has arranged thereon a third annular portion 76, which is substantially annular and protrudes axially downward. When the motor 2 has been assembled, the third annular portion 76 and the second cylindrical portion 73 are arranged to hold an axially upper end portion of the bearing housing 431 therebetween.

As illustrated in FIG. 4, an inner circumferential edge 77, which defines the through hole 75, of the first insulator 7 has arranged thereon a plurality of (for example, four, in the present preferred embodiment) axially extending groove portions 78. Circumferential positions of the groove portions 78 correspond with those of the tooth portions 721.

The inner circumferential edge 77 including the groove portions 78 is curved such that the diameter thereof gradually decreases in the axially downward direction. In addition, the inner circumferential edge 77 is radially opposed to the third annular portion 76 with a gap therebetween. The inner circumferential edge 77 is thus elastically deformable in a radially outward direction, with a joint between the second annular portion 74 and the third annular portion 76 as a fixed end.

Moreover, as illustrated in FIGS. 3 and 4, the shape of the inner circumferential edge 77 is similar to the shape of the outside surface of the collar portion 52 when viewed in the axial direction. In the first preferred embodiment, both the inner circumferential edge 77 and the outside surface of the collar portion 52 preferably are substantially in the shape of a cross.

As illustrated in FIG. 5, the inner circumferential edge 77 has a portion with a radius R3. Here, the term "radius" refers to the radial distance between the central axis J1 and the inner circumferential edge 77. The portion with the radius R3 is in the shape of a circular arc centered on the central axis J1.

Similarly, as illustrated in FIGS. 4 and 5, each groove portion 78 has a portion with a radius R4 which is substantially in the shape of a circular arc centered on the central axis J1. The radius R4 is greater than the radius R3.

As illustrated in FIG. 6, both the radii R3 and R4 defined with respect to the first insulator 7 are smaller than either of the radii R1 and R2 defined with respect to the collar portion 52. In addition, when the centrifugal fan 1 has been assembled, an axially upper surface (hereinafter referred to simply as an "upper surface") of the collar portion 52 is axially opposed to a bottom portion of the inner circumferential edge 77. Thus, when a shock or the like from an outside causes the shaft 6 to move axially upward relative to the base portion 43, the collar portion 52 will come into axial contact with the inner circumferential edge 77.

Thus, the boss portion 5 and the first insulator 7 combine to define a coming-off preventing mechanism to prevent the shaft 6 from coming off the bearing housing 431.

When the centrifugal fan 1 is assembled, the collar portion 52 and the inner circumferential edge 77 are first arranged in a predetermined circumferential orientation relative to each other, and thereafter the collar portion 52 is inserted into the through hole 75. Details of this insertion will be described below.

Figure 7:
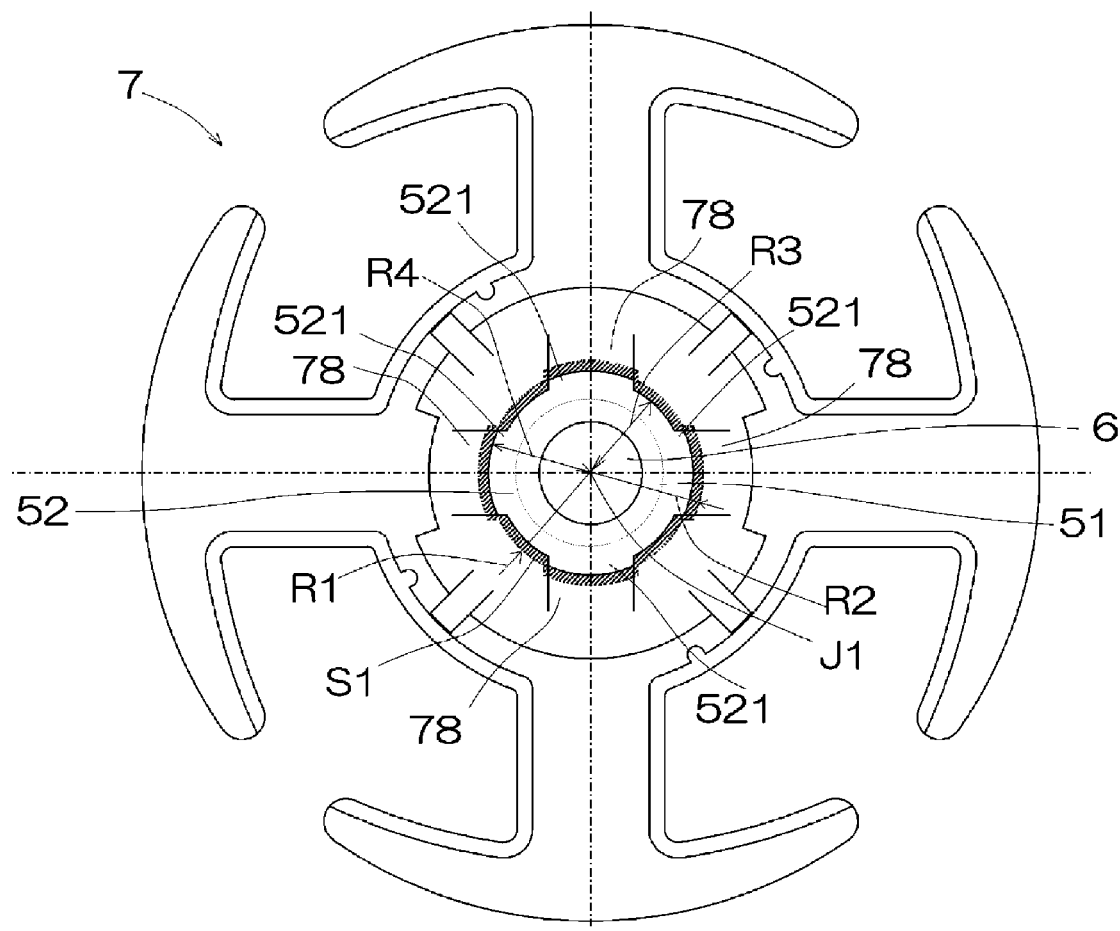
FIG. 7 is a partial cross-sectional view illustrating a state in which the boss portion and the first insulator are engaged with each other, according to the first preferred embodiment of the present invention.
Figure 8:
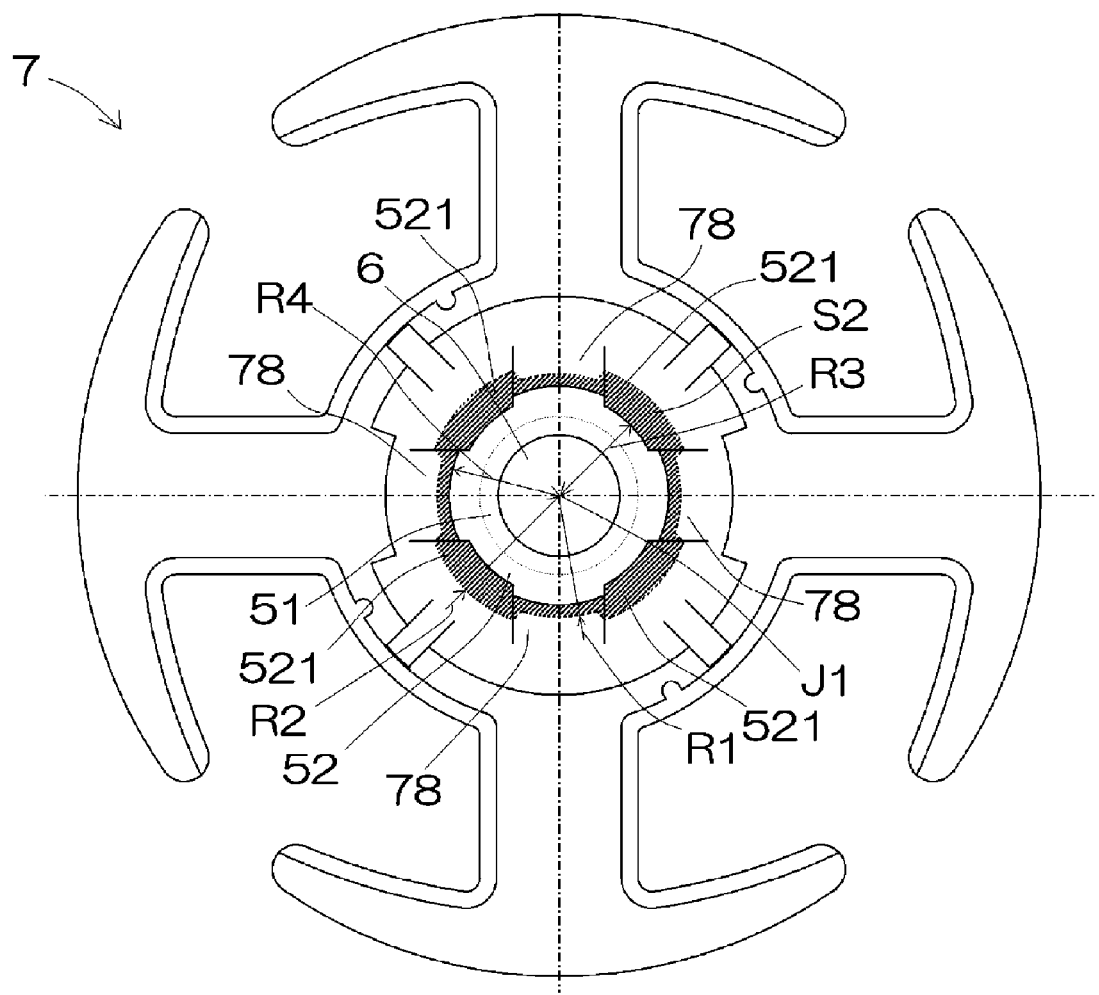
FIG. 8 illustrates a state of the boss portion and the first insulator when the boss portion has been turned in a circumferential direction relative to the first insulator as compared to the state as illustrated in FIG. 7.

FIG. 7 is a partial cross-sectional view illustrating a state in which the boss portion 5 and the first insulator 7 are engaged with each other in FIG. 6. FIG. 8 illustrates a state of the boss portion 5 and the first insulator 7 when the boss portion 5 has been turned about 45 degrees in the circumferential direction relative to the first insulator 7 as compared to the state as illustrated in FIG. 7. In FIGS. 7 and 8, those portions of the collar portion 52 and the inner circumferential edge 77 which overlap with each other in the axial direction are indicated by hatching. Areas of the overlapping portions in FIGS. 7 and 8 are denoted as S1 and S2, respectively.

In FIG. 7, circumferential positions of the projecting portions 521 correspond with those of the groove portions 78. In other words, circumferential positions of those portions of the collar portion 52 which have the greatest radius (i.e., the radius R2) correspond with circumferential positions of those portions of the inner circumferential edge 77 which have the greatest radius (i.e., the radius R4), while at the same time circumferential positions of those portions of the collar portion 52 which have the smallest radius (i.e., the radius R1)

correspond with circumferential positions of those portions of the inner circumferential edge 77 which have the smallest radius (i.e., the radius R3).

On the other hand, in FIG. 8, as a result of the aforementioned circumferential turn of the boss portion 5 relative to the first insulator 7, as compared to the state of FIG. 7, the projecting portions 521 and the groove portions 78 are circumferentially displaced from each other at an angle of approximately 45 degrees. In other words, the circumferential positions of those portions of the collar portion 52 which have the greatest radius (i.e., the radius R2) correspond with the circumferential positions of those portions of the inner circumferential edge 77 which have the smallest radius (i.e., the radius R3), while at the same time the circumferential positions of those portions of the collar portion 52 which have the smallest radius (i.e., the radius R1) correspond with the circumferential positions of those portions of the inner circumferential edge 77 which have the greatest radius (i.e., the radius R4).

Therefore, the area S2 is greater than the area S1. As described above, the areas S1 and S2 are the area of those portions of the collar portion 52 and the inner circumferential edge 77 which overlap with each other in the axial direction. An increase in this area means an increase in an area of axial contact between the collar portion 52 and the inner circumferential edge 77 when the shaft 6 would be coming off the bearing housing 431. The greater this area is, the less likely the collar portion 52 is to come off through the through hole 75, due to the contact between the upper surface of the collar portion 52 and a lower end of the inner circumferential edge 77.

That is, the aforementioned circumferential turn of the boss portion 5 relative to the first insulator 7 contributes to an improvement in preventing the shaft 6 from coming off the bearing housing 431.

A consideration of the circumferential turn of the boss portion 5 relative to the first insulator 7 will show that the area of the axial overlapping of the collar portion 52 and the inner circumferential edge 77 reaches its maximum in the case of the state as illustrated in FIG. 8. That is, when relative circumferential orientations of the boss portion 5 and the first insulator 7 are in the state as illustrated in FIG. 8, the shaft 6 is most effectively prevented from coming off the bearing housing 431.

Regarding motors in general, the amount of a torque produced at the start of rotation of the rotor portion varies in accordance with the circumferential orientation of the rotor portion in a stationary state relative to the stator portion. Thus, it may be hard to start the rotation of the rotor portion when the rotor portion in the stationary state is in a certain circumferential orientation relative to the stator portion. Moreover, in some cases, detection of a magnetic pole of the rotor magnet using a position detection device, such as, for example, a Hall element, may become difficult. In order to prevent such problems, various design ideas are applied to the motors in general so that the rotor portion will stop in a specific predetermined circumferential orientation relative to the stator portion. This facilitates the detection of the position of a magnetic pole of the rotor magnet using the position detection device, and allows a great amount of torque to be produced at the start of the rotation of the rotor portion.

In the first preferred embodiment also, it is arranged such that the rotor portion 21 should stop in a predetermined circumferential orientation relative to the stator portion 22. At the same time, it is arranged such that when the rotor portion 21 is in the stationary state, the relative circumferential orientations of the boss portion 5 and the first insulator 7 should be in the state as illustrated in FIG. 8.

That is, the rotor portion 21 including the shaft 6 is arranged to stop relative to the stator portion 22 in such a positional state that the shaft 6 is most effectively prevented from coming off the bearing housing 431.

Thus, even if a shock or the like is applied to the centrifugal fan 1 from the outside, the shaft 6 is prevented from coming off the bearing housing 431, regardless of whether the shaft 6 is rotating or in the stationary state.

Next, a method of engaging the boss portion 5 and the first insulator 7 with each other will now be described below.

Figure 9A:
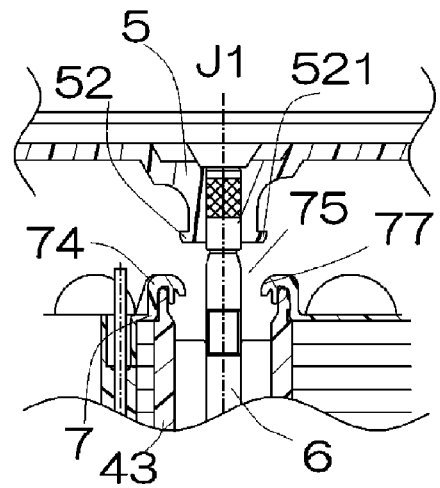
FIGS. 9A, 9B, and 9C are partial cross-sectional views of the centrifugal fan according to the first preferred embodiment of the present invention.
Figure 9B:
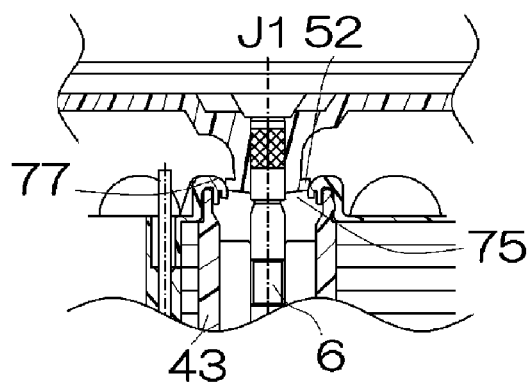
Figure 9C:
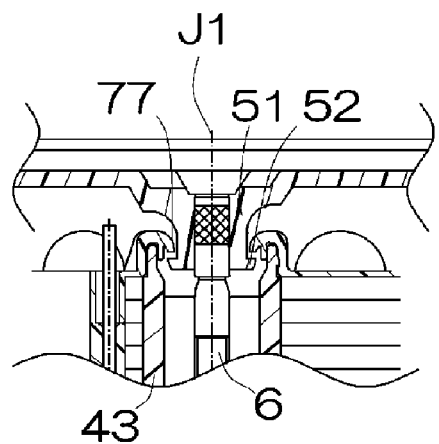

FIGS. 9A, 9B, and 9C are partial cross-sectional views of the centrifugal fan 1, illustrating how the boss portion 5 and the first insulator 7 are engaged with each other.

When the boss portion 5 and the first insulator 7 are engaged with each other, as illustrated in FIG. 9A, the shaft 6 is first inserted into the interior of the bearing housing 431, and thereafter the collar portion 52 is arranged axially opposite the through hole 75, such that the circumferential positions of the projecting portions 521 correspond with those of the groove portions 78.

Thereafter, the collar portion 52 is relatively moved axially closer to the through hole 75, and the collar portion 52 is inserted into the through hole 75 while being in contact with the inner circumferential edge 77.

As described above, when viewed in the axial direction, the shape of the outside surface of the collar portion 52 and the shape of the inner circumferential edge 77 are similar to each other. Therefore, when the collar portion 52 is inserted into the through hole 75, corresponding portions of the collar portion 52 and the inner circumferential edge 77, e.g., the projecting portions 521 and the groove portions 78, are preferably arranged in alignment.

Moreover, both the radii R1 and R2 of the collar portion 52 are greater than either of the radii R3 and R4 of the inner circumferential edge 77. Furthermore, the inner circumferential edge 77 is elastically deformable in the radial direction, with the joint between the second annular portion 74 and the third annular portion 76 as the fixed end. Meanwhile, the collar portion 52 is elastically deformable in the axial direction, with a joint between the collar portion 52 and the columnar portion 51 as a fixed end.

Therefore, as illustrated in FIG. 9B, when the collar portion 52 is inserted into the through hole 75, the collar portion 52 comes into contact with the inner circumferential edge 77, so that the inner circumferential edge 77 is elastically deformed in the radially outward direction. At the same time, the collar portion 52 is elastically deformed in the axial direction.

Accordingly, despite the fact that the radii R1 and R2 of the collar portion 52 and the radii R3 and R4 of the inner circumferential edge 77 have the aforementioned relationships, the collar portion 52 can be inserted into inside of the through hole 75 with application of only a slight force.

Furthermore, the outside surface of the collar portion 52 has a curved surface with its radial dimension gradually increasing in an axially upward direction. Similarly, the radial dimension of the inner circumferential edge 77 gradually increases in the axially upward direction.

Accordingly, the collar portion 52 can be inserted into inside of the through hole 75 smoothly, with a minimum area of contact between the collar portion 52 and the inner circumferential edge 77 and with reduced friction.

Then, as illustrated in FIG. 9C, the collar portion 52 is relatively moved axially downward inside the through hole 75, until the collar portion 52 passes through the through hole 75. At this time, the columnar portion 51 is radially opposed to the inner circumferential edge 77 with a gap therebetween. Thus, the upper surface of the collar portion 52 is axially opposed to the bottom portion of the inner circumferential edge 77, so that the aforementioned coming-off preventing mechanism is defined by a combination of the collar portion 52 and the inner circumferential edge 77.

In the above-described manner, the boss portion 5 is brought into engagement with the first insulator 7 such that the boss portion 5 is rotatable in the circumferential direction.

As described above, when the collar portion 52 is inserted into the through hole 75, the circumferential positions of the projecting portions 521 need be arranged to correspond with those of the groove portions 78. Note, however, that after the collar portion 52 has come into contact with the inner circumferential edge 77, the boss portion 5 may be turned in the circumferential direction relative to the first insulator 7 so that the circumferential positions of the projecting portions 521 correspond with those of the groove portions 78.

In the case where, after the collar portion 52 has come into contact with the inner circumferential edge 77, the collar portion 52 is turned in the circumferential direction while being in contact with the inner circumferential edge 77, the projecting portions 521 are moved to positions of the groove portions 78 while being in contact with those portions of the inner circumferential edge 77 which are not provided with any groove portion 78.

As described above, the radius R2 of the projecting portions 521 is greater than either of the radii R3 and R4 of the inner circumferential edge 77. In addition, the radius R4 of the groove portions 78 is greater than the radius R3 of those portions of the inner circumferential edge 77 which are not provided with any groove portion 78.

Accordingly, when each projecting portion 521 is moved in a sliding manner on the inner circumferential edge 77, an area of contact between the projecting portion 521 and any groove portion 78 is smaller than an area of contact between the projecting portion 521 and any portion of the inner circumferential surface 78 which is not provided with any groove portion 78.

Therefore, when an operator, during the step of engaging the boss portion 5 with the first insulator 7, turns the collar portion 52 in the circumferential direction on the inner circumferential edge 77 after the collar portion 52 has come into contact with the inner circumferential edge 77, the difference in the area of contact helps the operator to recognize that the circumferential positions of the projecting portions 521 correspond with those of the groove portions 78. Provision of an axial shoulder in each groove portion 78 will make the difference in the area of contact more easily recognizable. This will help the operator to progress the engaging operation more smoothly, and contribute to reducing work time and a cost required for assembling the centrifugal fan 1.

Next, a second preferred embodiment will be described below. A centrifugal fan according to the second preferred embodiment is similar in structure to the centrifugal fan 1 according to the first preferred embodiment except in the structures of a boss portion 5A and a first insulator 7A.

Figure 10:
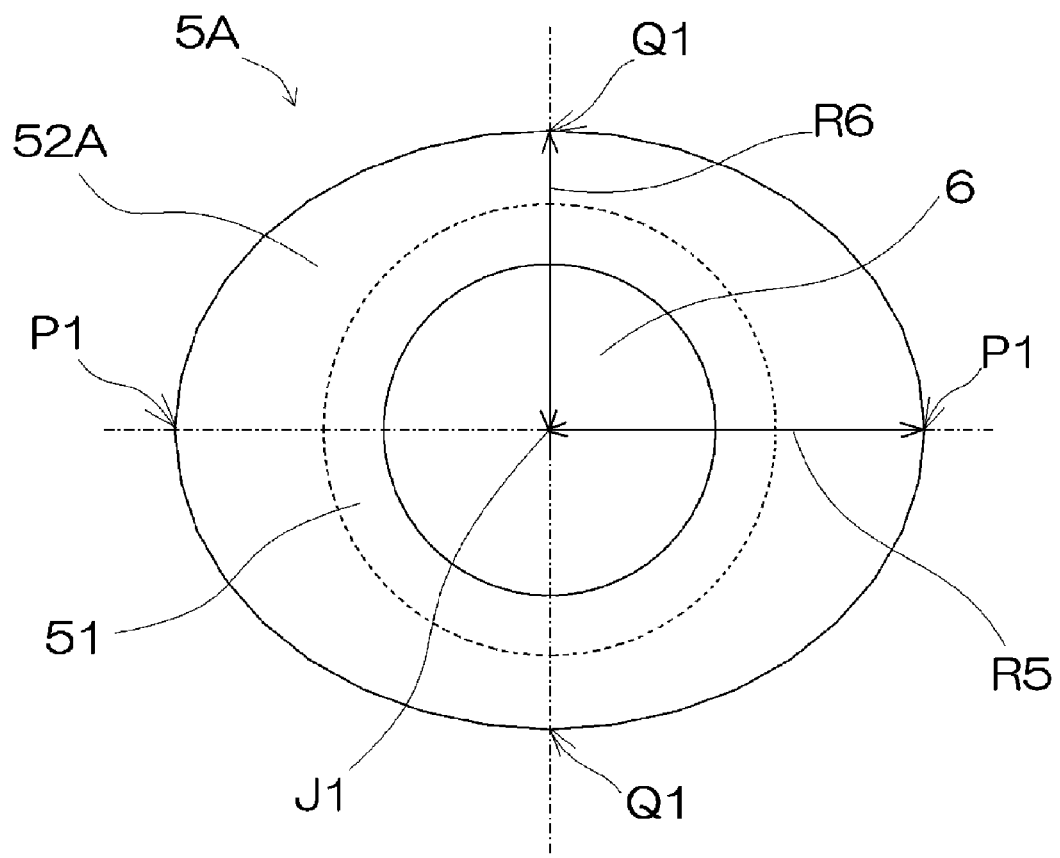
FIG. 10 is a partial cross-sectional view of a boss portion according to a second preferred embodiment of the present invention.

FIG. 10 is a partial cross-sectional view of the boss portion 5A with a collar portion 52A according to the second preferred embodiment, taken along a plane substantially perpendicular to the central axis J1.

As illustrated in FIG. 10, a cross section of the collar portion 52A has a substantially elliptical outer shape. The radius of the collar portion 52A with respect to the central axis J1 varies continuously in the circumferential direction. In FIG. 10, the collar portion 52A has radii R5 and R6 at points P1 and Q1 which define a major axis and a minor axis, respectively, for example.

Although not shown, as in the first preferred embodiment, an outside surface of the collar portion 52A is curved across its circumference such that the radial dimension thereof gradually increases in the axially upward direction. Moreover, the collar portion 52A is elastically deformable in the axial direction, with a joint between the collar portion 52A and the columnar portion 51 as a fixed end.

Figure 11:
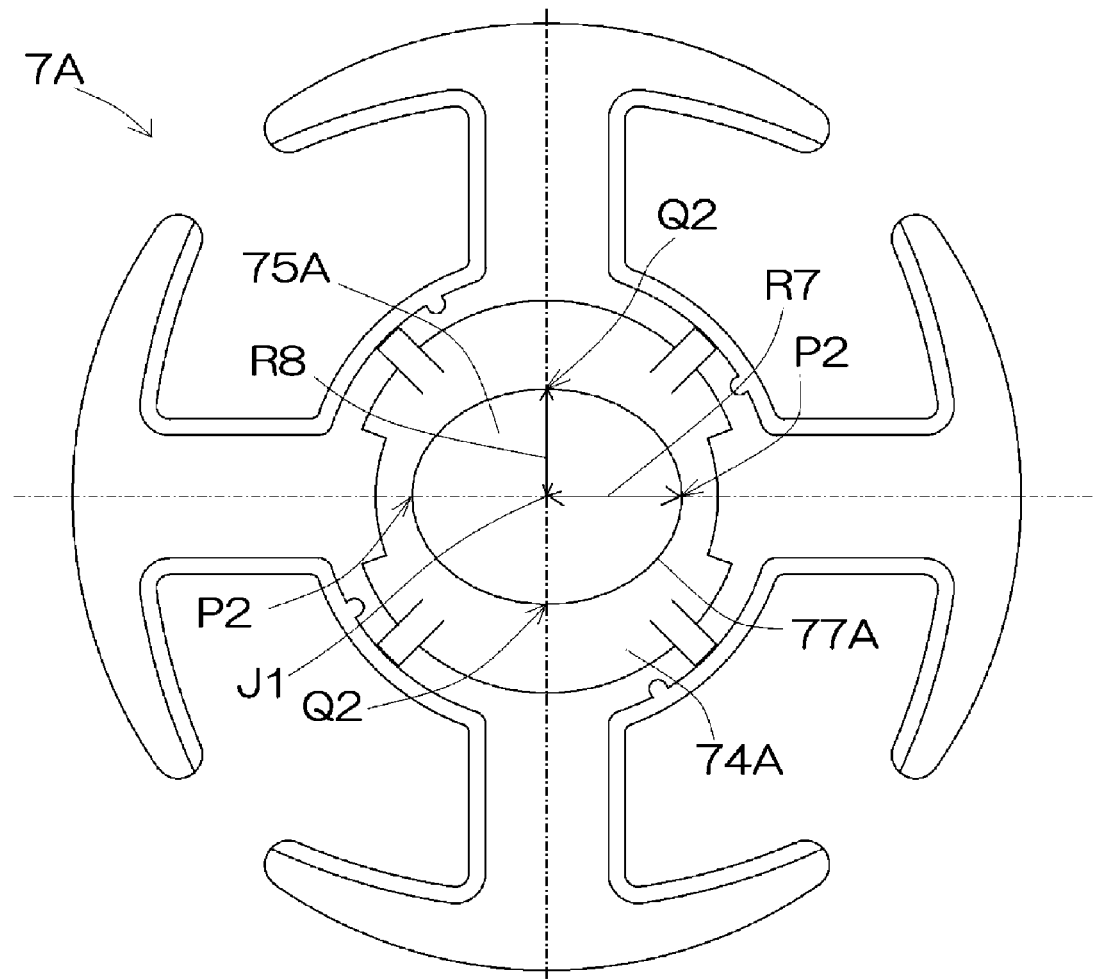
FIG. 11 illustrates a first insulator according to the second preferred embodiment of the present invention.

FIG. 11 illustrates the first insulator 7A according to the second preferred embodiment, as viewed from above in the axial direction.

As illustrated in FIG. 11, the first insulator 7A has a through hole 75A defined by an inner circumferential edge 77A thereof. The shape of the inner circumferential edge 77A as viewed in the axial direction is substantially elliptical.

The radius of the inner circumferential edge 77A with respect to the central axis J1 varies continuously in the circumferential direction. In FIG. 11, the inner circumferential edge 77A has radii R7 and R8 at points P2 and Q2 which define a major axis and a minor axis, respectively, for example.

As in the first preferred embodiment, the inner circumferential edge 77A is curved across its circumference such that the radial dimension thereof gradually increases in the axially upward direction. Moreover, the inner circumferential edge 77A is elastically deformable in the radial direction, with a joint between a second annular portion 74A and the third annular portion 76 as a fixed end.

As illustrated in FIGS. 10 and 11, the shape of the inner circumferential edge 77A and the shape of the outside surface of the collar portion 52A are similar to each other when viewed in the axial direction. In addition, the radius R5 of the collar portion 52A is greater than the radius R7 of the inner circumferential edge 77A. Similarly, the radius R6 of the collar portion 52A is greater than the radius R8 of the inner circumferential edge 77A.

A procedure of engaging the boss portion 5A with the first insulator 7A is similar to the procedure of engaging the boss portion 5 with the first insulator 7 according to the first preferred embodiment. First, the collar portion 52A and the through hole 75A are arranged to face each other in the axial direction. Then, the circumferential positions of the points P1 and Q1 at the ends of the major and minor axes of the collar portion 52A are arranged to correspond with those of the points P2 and Q2 at the ends of the major and minor axes of the inner circumferential edge 77A. This allows the collar portion 52A to be inserted into the through hole 75A.

Note that, as in the first preferred embodiment, the collar portion 52A and the inner circumferential edge 77A may be brought into circumferential alignment either before or after the collar portion 52A is brought into contact with the inner circumferential edge 77A. The operator is able to sense and thereby recognize that the major and minor axes of the collar portion 52A and the inner circumferential edge 77A are in alignment. Therefore, the operator is able to engage the boss portion 5A with the first insulator 7A easily.

As described above, both the outside surface of the collar portion 52A and the inner circumferential edge 77A have a curved surface and are capable of elastic deformation. Accordingly, as in the first preferred embodiment, the collar portion 52A can be inserted into the through hole 75A smoothly, and the collar portion 52A and the inner circumferential edge 77A undergo elastic deformation while being in contact with each other.

Moreover, the radii R5 and R6 of the collar portion 52A and the radii R7 and R8 of the inner circumferential edge 77A have the aforementioned relationships. Accordingly, as in the first preferred embodiment, when the centrifugal fan 1 has been assembled, an upper surface of the collar portion 52A and a bottom portion of the inner circumferential edge 77A are axially opposed to each other. Thus, a coming-off preventing mechanism to prevent the shaft 6 from coming off the bearing housing 431 is defined by a combination of the collar portion 52A and the inner circumferential edge 77A.

Figure 12:
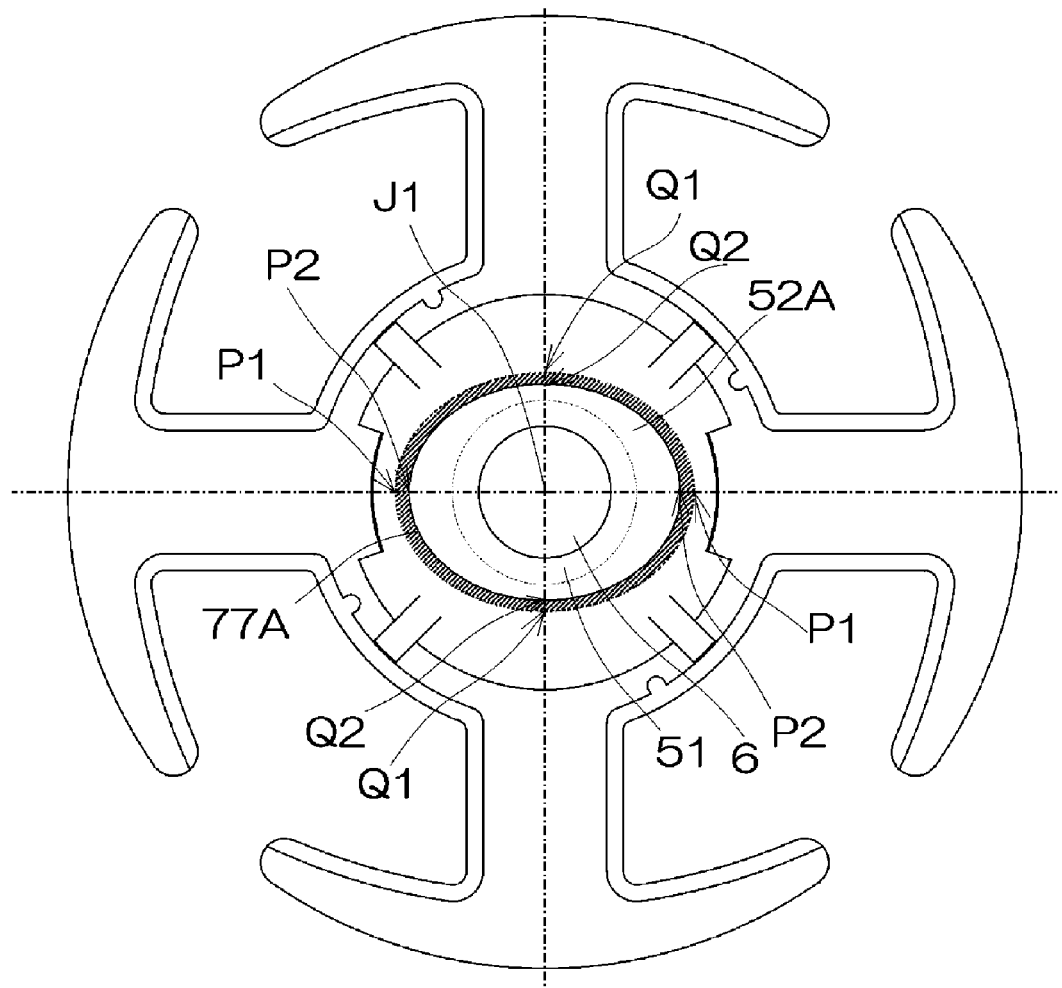
FIG. 12 is a partial cross-sectional view of the boss portion and the first insulator according to the second preferred embodiment of the present invention, illustrating a state in which the boss portion and the first insulator are engaged with each other.
Figure 13:
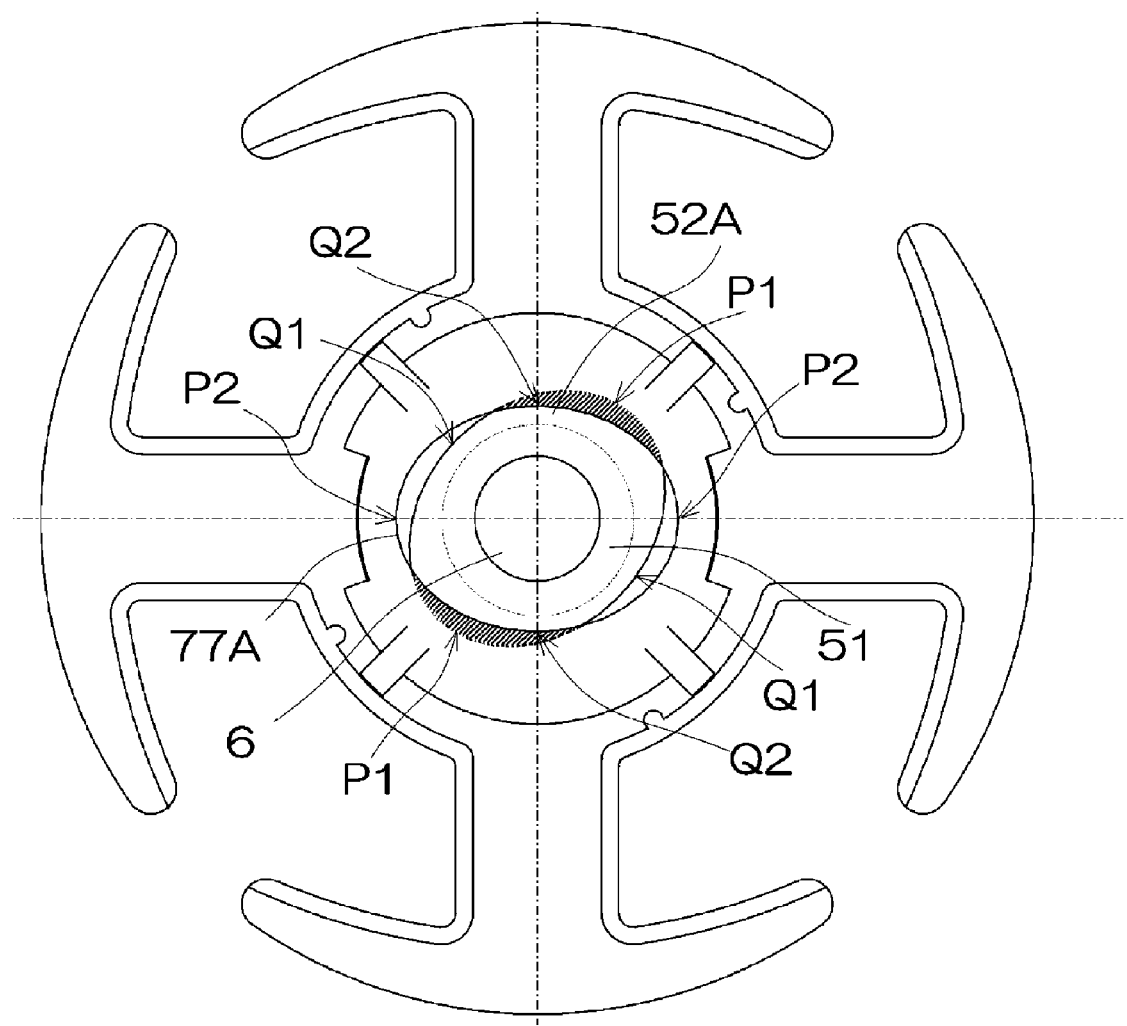
FIG. 13 illustrates a state of the boss portion and the first insulator when the boss portion has been turned in the circumferential direction relative to the first insulator as compared to the state as illustrated in FIG. 12.

FIG. 12 is a partial cross-sectional view of the boss portion 5A and the first insulator 7A, illustrating a state in which the boss portion 5A and the first insulator 7A are engaged with each other. FIG. 13 illustrates a state of the boss portion 5A and the first insulator 7A when the boss portion 5A has been turned about 45 degrees in the circumferential direction relative to the first insulator 7A as compared to the state as illustrated in FIG. 12. In FIGS. 12 and 13, those portions of the collar portion 52A and the inner circumferential edge 77A which overlap with each other in the axial direction are indicated by hatching.

In FIG. 12, the circumferential orientations of the major and minor axes of the ellipse defined by the outside surface of the collar portion 52A correspond with those of the major and minor axes of the ellipse defined by the inner circumferential edge 77A, respectively.

In FIG. 13, the major and minor axes of the collar portion 52A and the major and minor axes of the inner circumferential edge 77A are circumferentially displaced from each other. As described above, the collar portion 52A and the inner circumferential edge 77A need be brought into proper circumferential alignment to permit the collar portion 52A to be inserted into the through hole 75A. With the state as illustrated in FIG. 13, it is difficult to insert the collar portion 52A into the through hole 75A.

Therefore, the aforementioned turn of the boss portion 5A relative to the first insulator 7A contributes to an improvement in preventing the shaft 6 as retained by the boss portion 5A from coming off the bearing housing 431.

Furthermore, in the second preferred embodiment, as well as in the first preferred embodiment, when the rotor portion 21 has stopped in a predetermined circumferential orientation relative to the stator portion 22, the major and minor axes of the collar portion 52A and those of the inner circumferential edge 77A are circumferentially displaced from each other (for example, in the state as illustrated in FIG. 13).

Thus, as in the first preferred embodiment, even if a shock or the like is applied to the centrifugal fan 1 from the outside, the shaft 6 is prevented from coming off the bearing housing 431, regardless of whether the shaft 6 is rotating or in the stationary state.

Next, a variation of the second preferred embodiment will now be described below. The structure of a centrifugal fan according to this variation of the second preferred embodiment is similar to that of the centrifugal fan 1 according to the second preferred embodiment except in a boss portion 5B, a first insulator 7B, and a bearing housing 431B.

First, a mechanism defined by the first insulator 7B and the bearing housing 431B to prevent the stator portion from coming off the bearing housing 431B will be described in detail below.

Figure 14A:
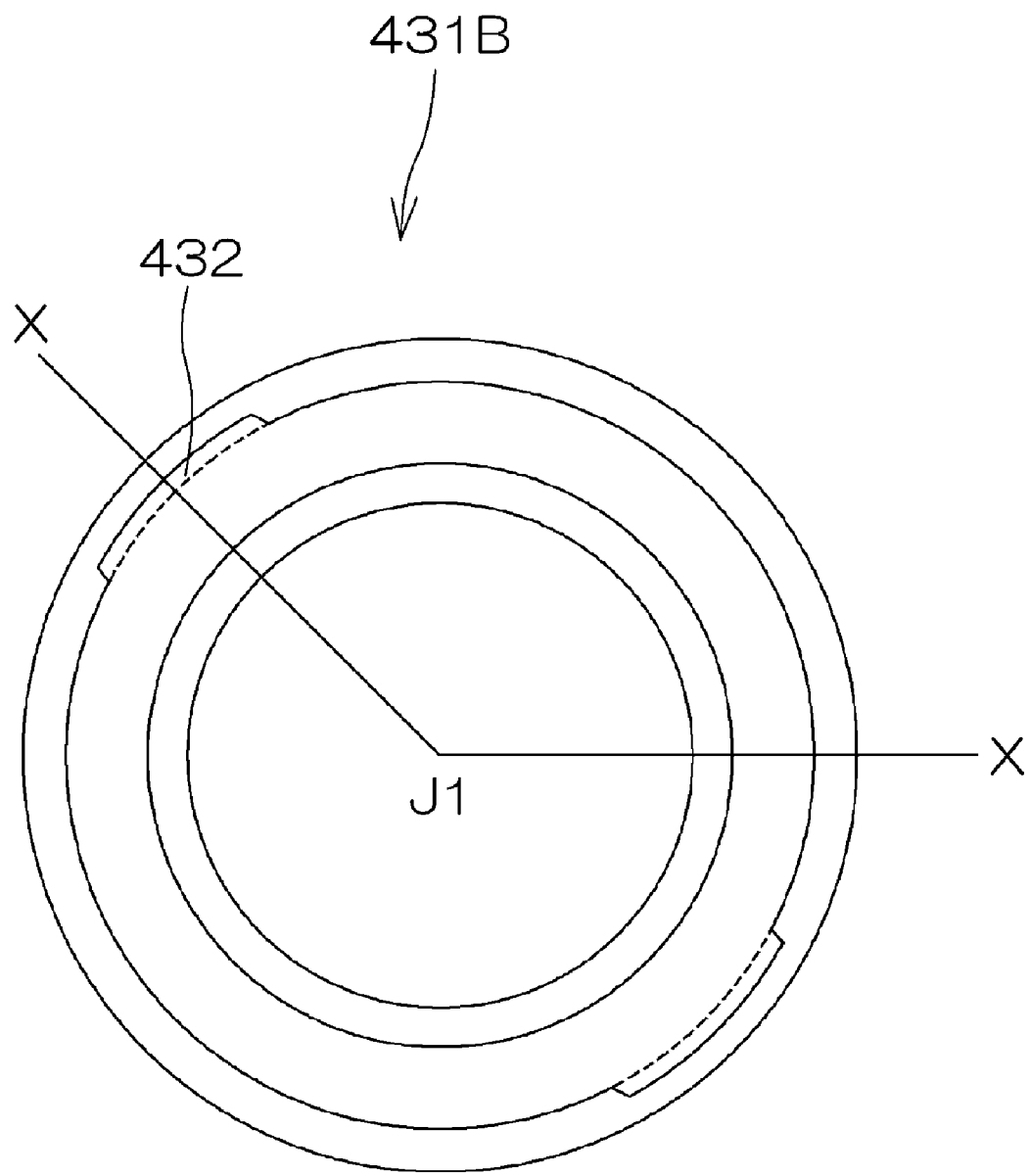
FIG. 14A is a plan view of a bearing housing according to a variation of the second preferred embodiment of the present invention, as viewed from above in the axial direction.
Figure 14B:
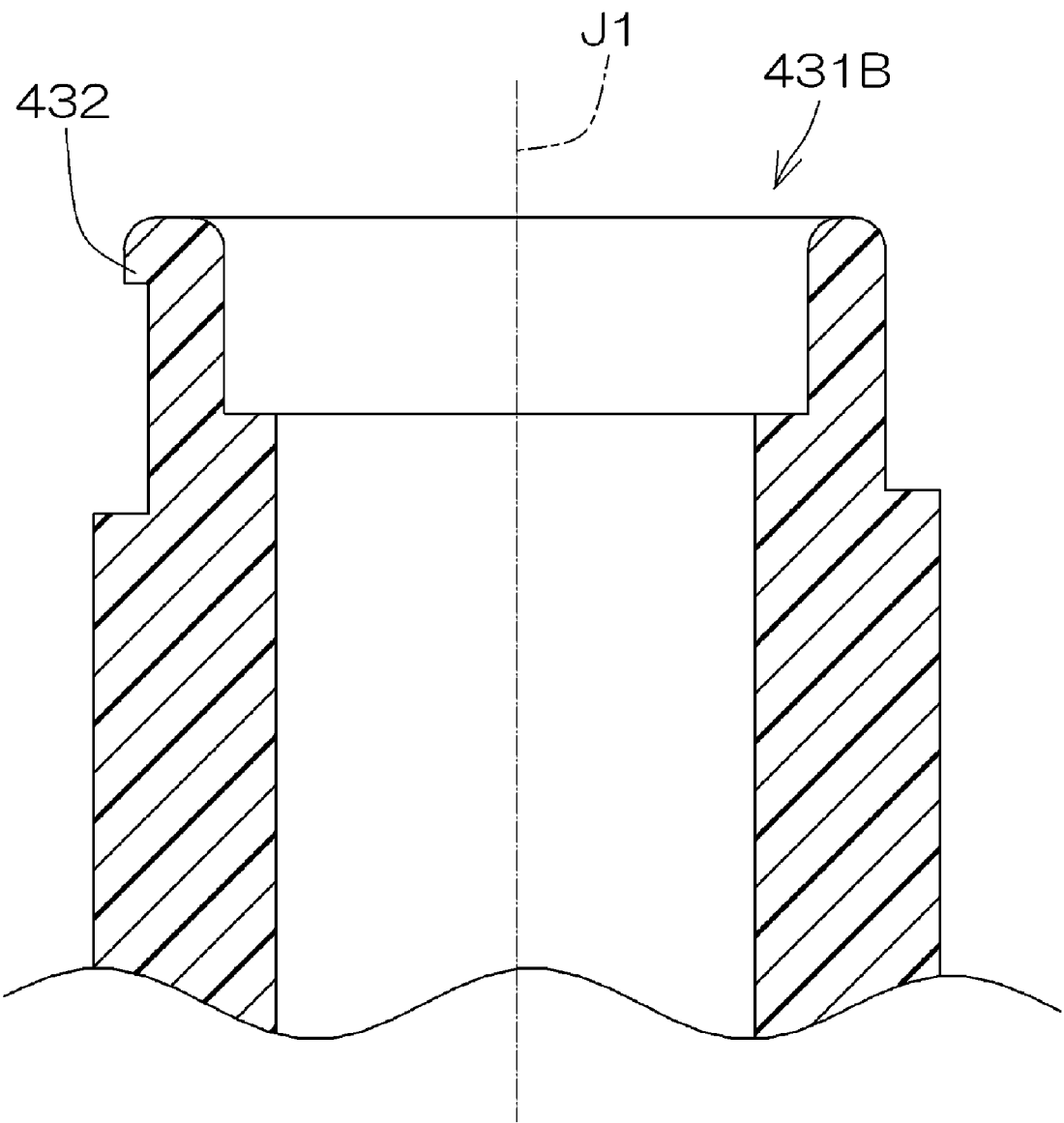
FIG. 14B is a partial cross-sectional view of the bearing housing taken along line X-J1-X of FIG. 14A.
Figure 15A:
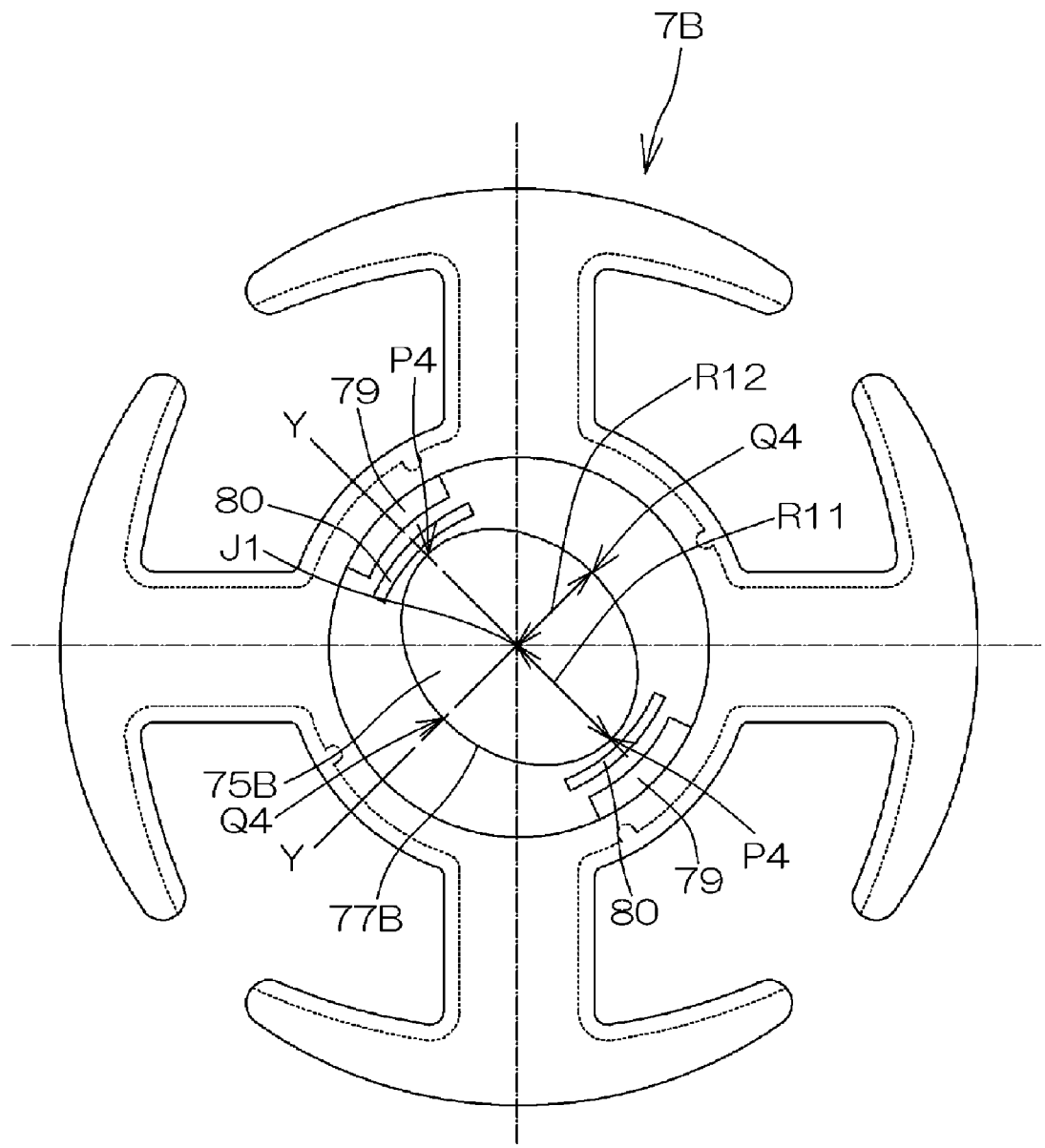
FIG. 15A is a plan view of a first insulator according to a variation of the second preferred embodiment of the present invention, as viewed from above in the axial direction.
Figure 15B:
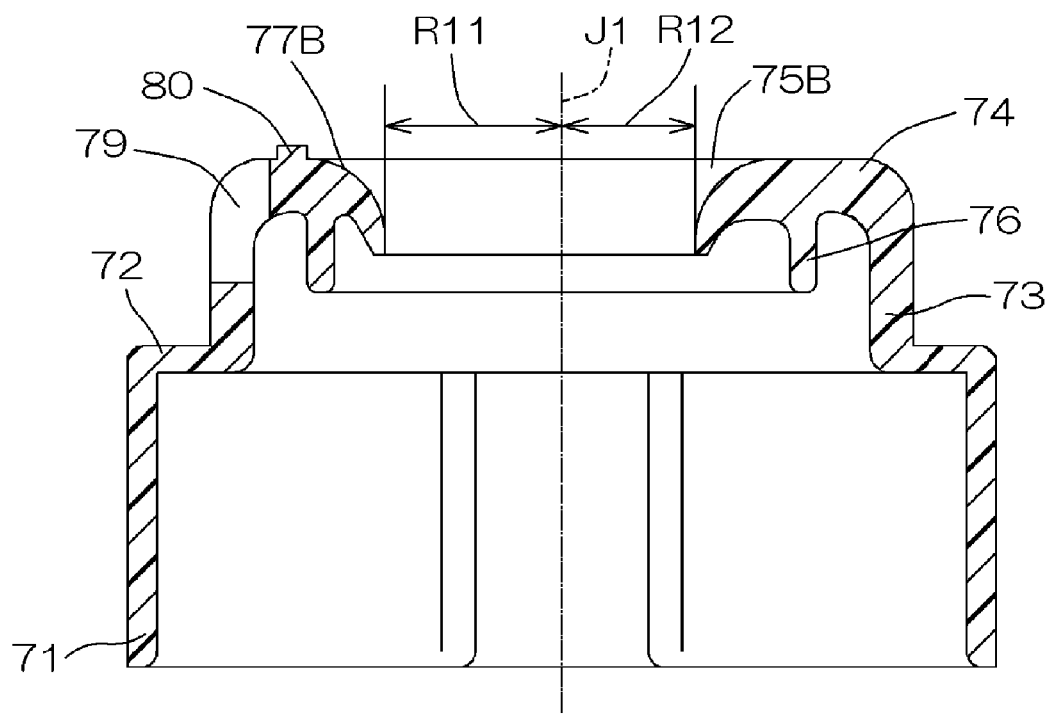
FIG. 15B is a partial cross-sectional view of the first insulator taken along line Y-J1-Y of FIG. 15A.
Figure 16:
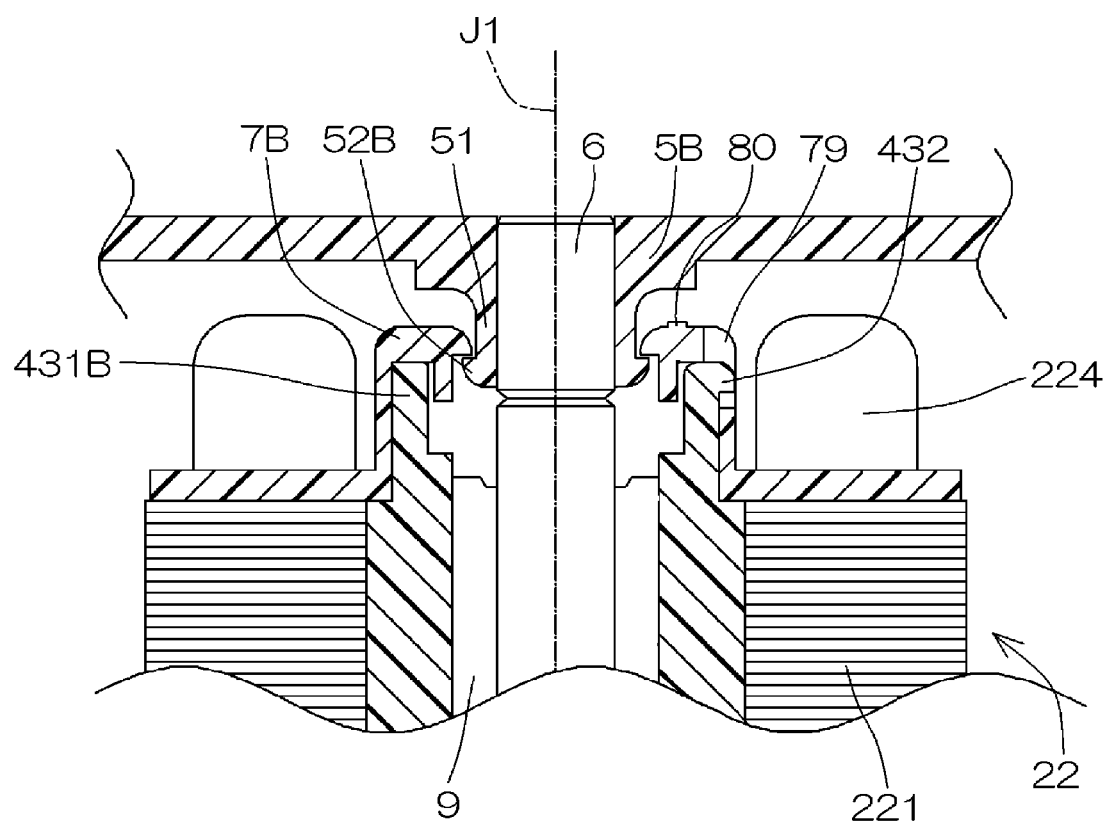
FIG. 16 is a cross-sectional view of a stator core, the bearing housing, etc., according to a variation of the second preferred embodiment of the present invention, when the stator core has been fitted into the bearing housing.

FIG. 14A is a plan view of the bearing housing 431B according to the present variation of the second preferred embodiment of the present invention, as viewed from above in the axial direction. FIG. 14B is a cross-sectional view of the bearing housing 431B taken along line X-J1-X of FIG. 14A. FIG. 15A is a plan view of the first insulator 7B according to the present variation of the second preferred embodiment of the present invention, as viewed from above in the axial direction. FIG. 15B is a cross-sectional view of the first insulator 7B taken along line Y-J1-Y of FIG. 15A. FIG. 16 is a cross-sectional view of the stator core 221, the bearing housing 431B, etc., when the stator core 221 has been fitted into the bearing housing 431B.

Referring to FIGS. 14A and 14B, the bearing housing 431B preferably includes two fitting projections 432, each having a specified circumferential extent, arranged at an axially upper end portion thereof to project radially outward from an outer circumferential surface thereof. The fitting projections 432 are preferably about 180 degrees apart from each other in the circumferential direction. In addition, referring to FIGS. 15A and 15B, the first insulator 7B includes two fitting holes 79 extending over the second annular portion 74 and the second cylindrical portion 73 and each arranged to engage with a separate one of the fitting projections 432. The distance between an outside surface of one of the fitting projections 432 and an outside surface of the other fitting projection 432 is greater than the diameter of an inner circumferential surface of the second cylindrical portion 73 of the first insulator 7B. Moreover, in the present variation of the second preferred embodiment, the bearing housing 431B is preferably made of a resin, for example. Therefore, when the stator core 221 fitted with the first insulator 7B is moved from above in the axial direction toward the bearing housing 431B to be fitted thereinto, the axially upper end portion of the bearing housing 431B, where the fitting projections 432 are provided, is elastically deformed in a radially inward direction once the fitting projections 432 are brought into contact with the second cylindrical portion 73. When the fitting projections 432 have thereafter reached the respective fitting holes 79, the distance between the outside surface of one of the fitting projections 432 and the outside surface of the other fitting projection 432 recovers its original value. As a result, referring to FIG. 16, the fitting projections 432 are fitted into the respective fitting holes 79, so that the stator core 221 is fixed to the bearing housing 431B, and the fitting projections 432 serve to prevent the stator core 221 from moving upward in the axial direction. The stator core 221 is thus prevented from coming off the bearing housing 431B. At the same time, circumferential positioning of the stator core 221 with respect to the bearing housing 431B is accomplished in a simple manner.

An area in the vicinity of each of the fitting holes 79 of the first insulator 7B has a problem in terms of strength because of a reduced amount of structural material, for example, resin. More specifically, when a collar portion 52B of the boss portion 5B is inserted into a through hole 75B of the first insulator 7B, a stress of the weight of the rotor portion 21 is transferred to the area in the vicinity of each fitting hole 79, which may cause damage, such as a crack, to any of the areas in the vicinity of the fitting holes 79. In view of this problem, the through hole 75B of the first insulator 7B and the collar portion 52B of the boss portion 5B have such a relationship as to allow the boss portion 5B to be inserted into the first insulator 7B to be in engagement therewith while preventing a damage to any of the areas in the vicinity of the fitting holes 79. This relationship will now be described in detail below.

Figure 17:
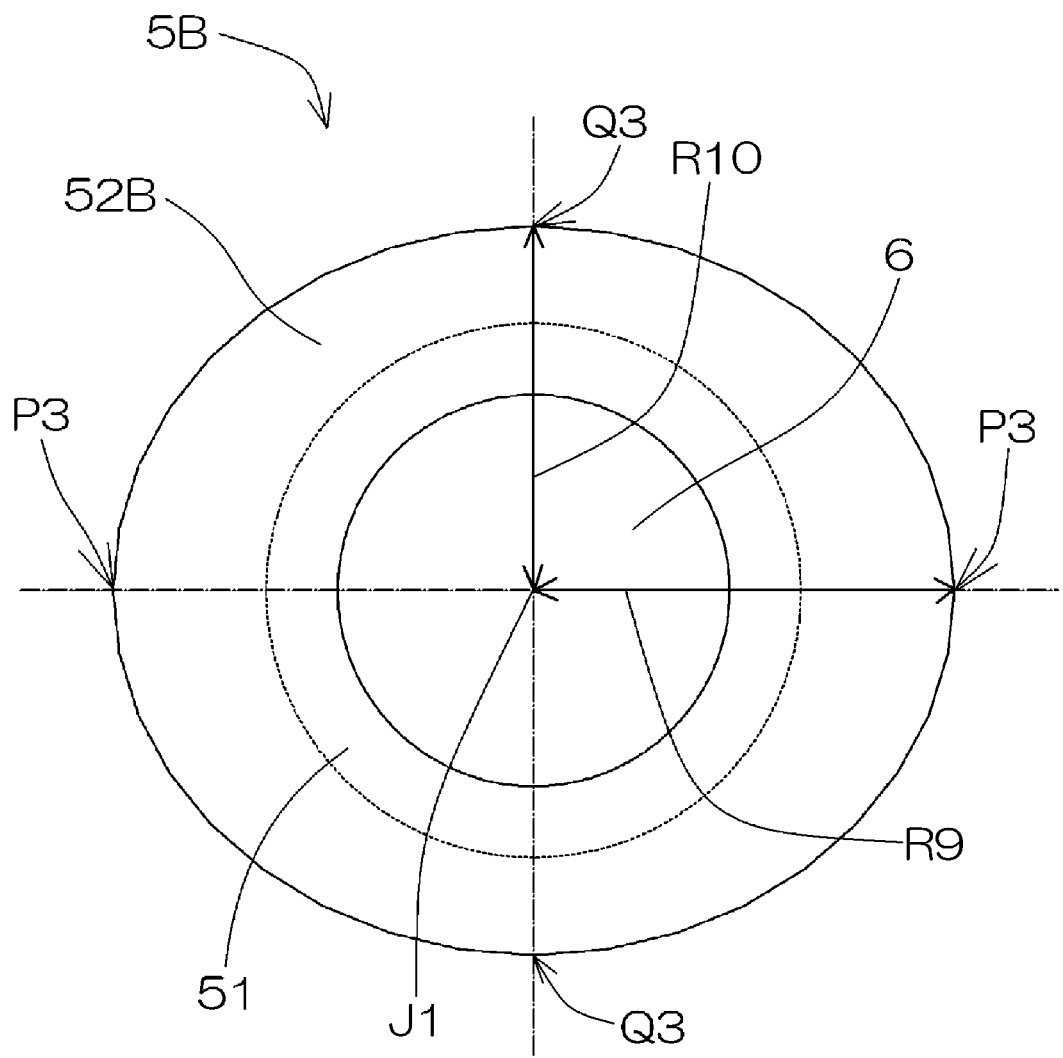
FIG. 17 is a partial cross-sectional view of a boss portion according to a variation of the second preferred embodiment of the present invention.

FIG. 17 is a partial cross-sectional view of the boss portion 5B with the collar portion 52B as illustrated in FIG. 16 according to the present variation of the second preferred embodiment, taken along a plane substantially perpendicular to the central axis J1.

In this cross-section, the outer shape of the collar portion 52B is substantially elliptical. The radius of the collar portion 52B varies continuously in the circumferential direction. In FIG. 17, the collar portion 52B has radii R9 and R10 at points P3 and Q3 which define a major axis and a minor axis, respectively, for example.

As illustrated in FIG. 16, an outside surface of the collar portion 52B is preferably curved across its circumference such that the radial dimension thereof gradually increases in the axially upward direction. Moreover, the collar portion 52B is elastically deformable in the axial direction, with a joint between the collar portion 52B and the columnar portion 51 as a fixed end.

As illustrated in FIG. 15A, the first insulator 7B has an inner circumferential edge 77B defining the through hole 75B. The shape of the inner circumferential edge 77B as viewed in the axial direction is substantially elliptical.

The radius of the inner circumferential edge 77B varies continuously in the circumferential direction. In FIG. 15A, the through hole 75B is defined such that points P4 that define a major axis are positioned in the vicinity of the fitting holes 79. The inner circumferential edge 77B has a radius R11 at the points P4 and a radius R12 at points Q4 that define a minor axis.

As is the case with the inner circumferential edge 77A according to the second preferred embodiment, the inner circumferential edge 77B is curved across its circumference such that the radial dimension thereof gradually increases in the axially upward direction. Moreover, the inner circumferential edge 77B is elastically deformable in the radial direction, with a joint between the second annular portion 74 and the third annular portion 76 as a fixed end.

Next, a relationship between the outer shape of the boss portion 5B and the contour of the through hole 75B according to the present variation of the second preferred embodiment will now be described in detail below. In the present variation, the radius R9 of the collar portion 52B is smaller than the radius R11 of the inner circumferential edge 77B, whereas the radius R10 of the collar portion 52B is greater than the radius R12 of the inner circumferential edge 77B.

A procedure of engaging the boss portion 5B with the first insulator 7B is similar to the procedure of engaging the boss portion 5A with the first insulator 7A according to the second preferred embodiment. First, the collar portion 52B and the through hole 75B are arranged to face each other in the axial direction. Then, the circumferential positions of the points P3 and Q3 at the ends of the major and minor axes of the collar portion 52B are arranged to become coincident with those of the points P4 and Q4 at the ends of the major and minor axes of the inner circumferential edge 77B. This enables the collar portion 52B to be inserted into the through hole 75B.

Note that, as in the second preferred embodiment, the collar portion 52B and the inner circumferential edge 77B may be brought into circumferential alignment either before or after the collar portion 52B is brought into contact with the inner circumferential edge 77B. The operator is able to sense and thereby recognize that the minor axes of the collar portion 52B and the inner circumferential edge 77B are in alignment. Therefore, the operator is able to engage the boss portion 5B with the first insulator 7B easily.

Figure 18:
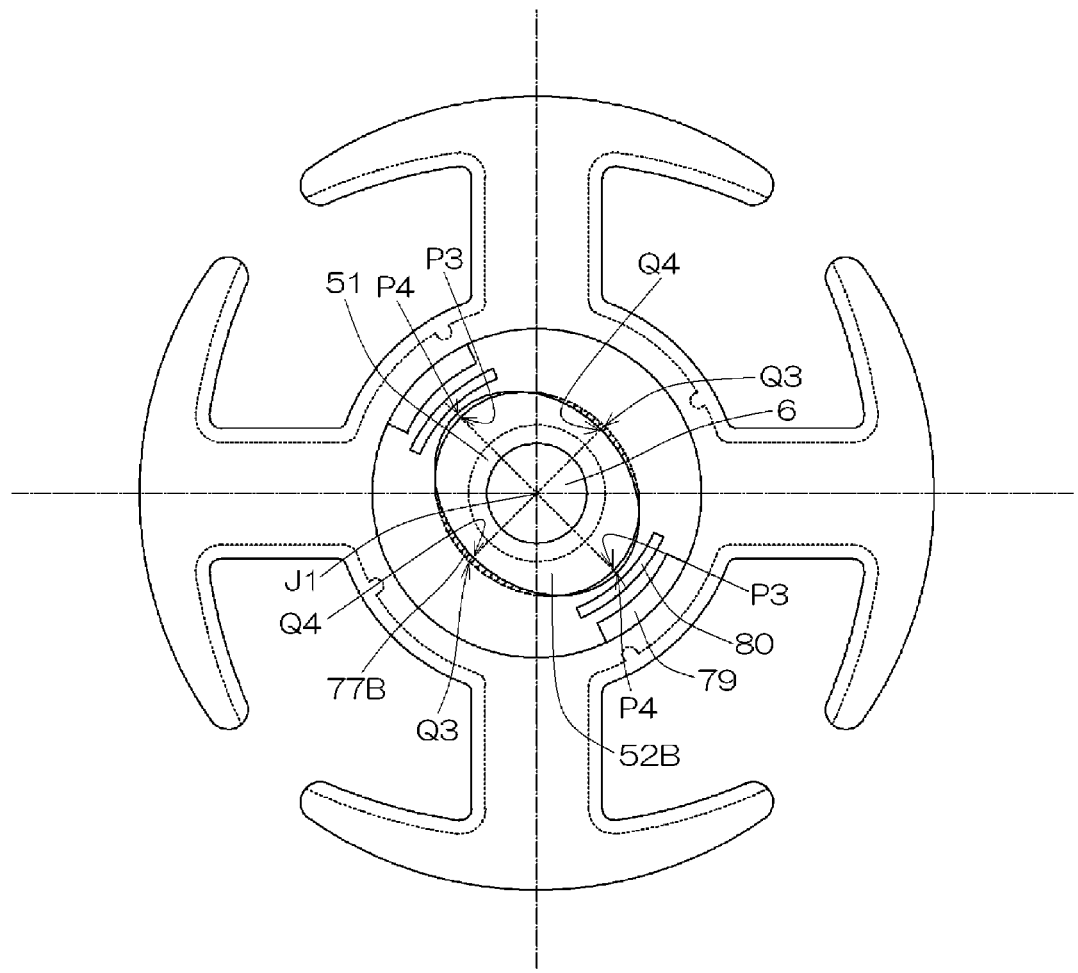
FIG. 18 is a partial cross-sectional view of the boss portion and the first insulator according to a variation of the second preferred embodiment, illustrating a state in which the boss portion and the first insulator are engaged with each other.
Figure 19:
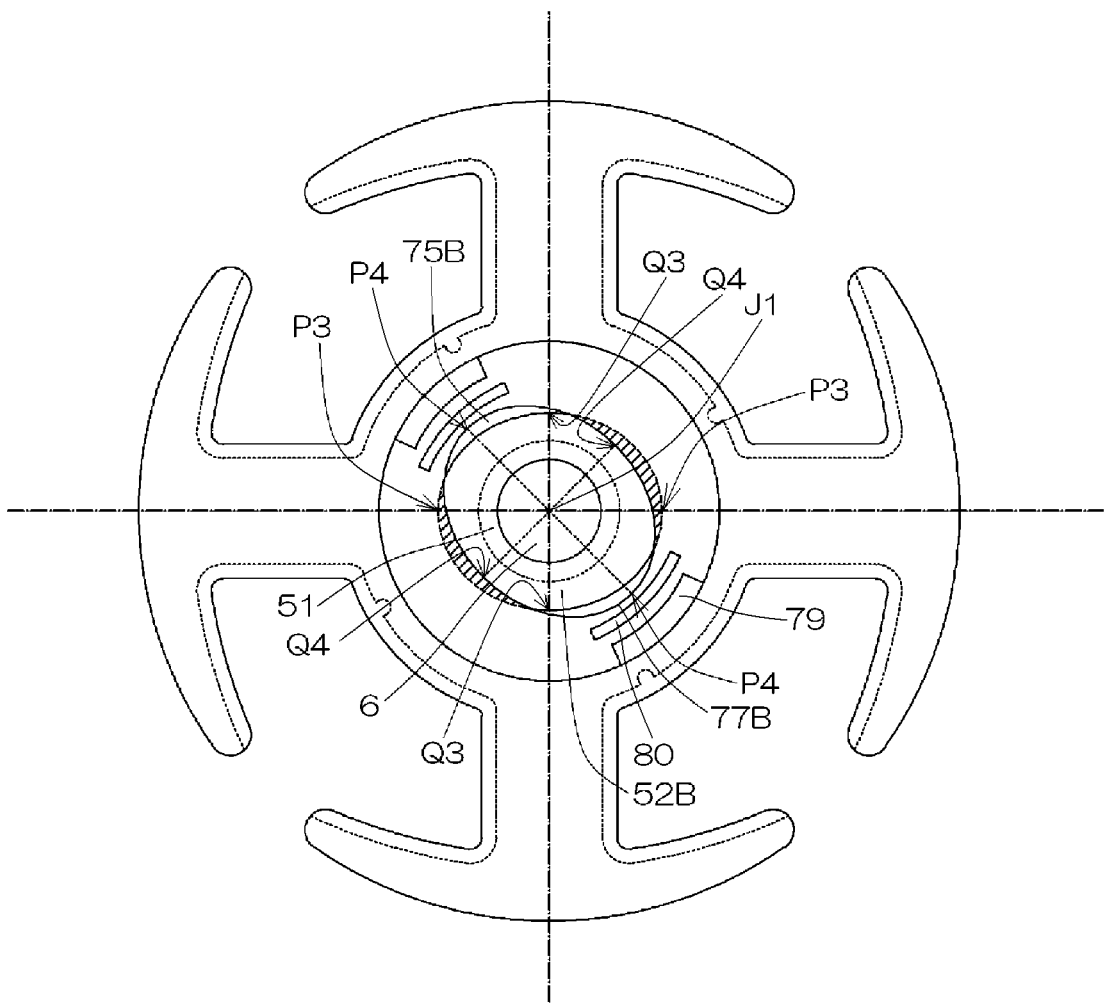
FIG. 19 illustrates a state of the boss portion and the first insulator when the boss portion has been turned in the circumferential direction relative to the first insulator as compared to the state as illustrated in FIG. 18.

As described above, both the outside surface of the collar portion 52B and the inner circumferential edge 77B have a curved surface and are capable of elastic deformation. Accordingly, as in the second preferred embodiment, when the operator arranges the boss portion 5B and the first insulator 7B such that the points Q3 and Q4 are in alignment with each other, and thereafter presses the boss portion 5B against the first insulator 7B in a direction that will bring the boss portion 5B into engagement with the first insulator 7B, the collar portion 52B and the inner circumferential edge 77B are, now being in contact with each other, elastically deformed to permit the collar portion 52B to be inserted inside the inner circumferential edge 77B with application of a slight force. This operation will be referred to herein after as a "press fitting operation." FIG. 18 is a partial cross-sectional view of the boss portion 5B and the first insulator 7B according to the present variation of the second preferred embodiment, illustrating a state in which the boss portion 5B and the first insulator 7B are engaged with each other. FIG. 19 illustrates a state of the boss portion 5B and the first insulator 7B when the boss portion 5B has been turned about 45 degrees in the circumferential direction relative to the first insulator 7B as compared to the state as illustrated in FIG. 18. In FIGS. 18 and 19, those portions of the collar portion 52B and the inner circumferential edge 77B which overlap with each other in the axial direction are indicated by hatching.

In FIG. 18, the circumferential orientations of the major and minor axes of the ellipse defined by the outside surface of the collar portion 52B correspond with those of the major and minor axes of the ellipse defined by the inner circumferential edge 77B, respectively.

As described above, the radius R10 of the collar portion 52B is greater than the radius R12 of the inner circumferential edge 77B. Therefore, when the centrifugal fan 1 has been assembled, an upper surface of those portions of the collar portion 52B which are in the vicinity of the points Q3 and a bottom portion of those portions of the inner circumferential edge 77B which are in the vicinity of the points Q4 are axially opposed to each other, as indicated by hatching in FIG. 18. A coming-off preventing mechanism to prevent the shaft 6 from coming off the bearing housing 431B is thus defined by a combination of the collar portion 52B and the inner circumferential edge 77B.

Moreover, as described above, the radius R9 of the collar portion 52B is smaller than the radius R11 of the inner circumferential edge 77B. Therefore, when the boss portion 5B is brought into engagement with the first insulator 7B, those portions of the collar portion 52B which are in the vicinity of the points P3 and those portions of the inner circumferential edge 77B which are in the vicinity of the points P4, where the fitting holes 79 are provided, do not come into contact with each other, that is, are not used as contact points in the press fitting operation, as illustrated in FIG. 18. Therefore, it is possible to bring the boss portion 5B into engagement with the first insulator 7B without a force being applied to either of the areas in the vicinity of the fitting holes 79. This contributes to preventing both the areas in the vicinity of the fitting holes 79 from suffering any damage, such as, for example, a crack.

Moreover, as illustrated in FIGS. 15A and 15B, the second annular portion 74 preferably has reinforcing ribs 80 provided on an axially upper surface thereof. Each of the reinforcing ribs 80 preferably extends along the length of a separate one of the fitting holes 79 (i.e., in the circumferential direction), and extends beyond both circumferential ends of the corresponding fitting hole 79. Provision of such reinforcing ribs 80 will increase the strength of the areas in the vicinity of the fitting holes 79.

Furthermore, referring to FIG. 19, as in the second preferred embodiment, it is possible to more effectively prevent the shaft 6 held by the boss portion 5B from coming off the bearing housing 431B by turning the boss portion 5B about 45 degrees in the circumferential direction relative to the first insulator 7B after the insertion of the boss portion 5B into the first insulator 7B.

Furthermore, in the present variation of the second preferred embodiment as well as in the second preferred embodiment, when the rotor portion 21 has stopped in a predetermined circumferential orientation relative to the stator portion 22, the major and minor axes of the collar portion 52B and those of the inner circumferential edge 77B are circumferentially displaced from each other. Thus, as in the second preferred embodiment, even if a shock or the like is applied to the centrifugal fan 1 from the outside, the shaft 6 is prevented from coming off the bearing housing 431B, regardless of whether the shaft 6 is rotating or in the stationary state.

In the above-described variation of the second preferred embodiment, the through hole 75B is defined such that the points that define the major axis of the inner circumferential edge 77B are positioned in the vicinity of the fitting holes 79. Note, however, that although not shown in the accompanying drawings, the through hole 75B may be defined such that the points that define the minor axis of the inner circumferential edge 77B are positioned in the vicinity of the fitting holes 79. In this case, beneficial effects similar to those achieved by the above-described variation of the second preferred embodiment can also be achieved as long as the radial dimension of that portion of the collar portion 52B which defines the major axis thereof is greater than the radial dimension of that portion of the inner circumferential edge 77B defining the through hole 75B which defines the major axis thereof, while at the same time the radial dimension of that portion of the collar portion 52B which defines the minor axis thereof is smaller than the radial dimension of that portion of the inner circumferential edge 77B defining the through hole 75B which defines the minor axis thereof. Note that in the case where the through hole 75B is defined such that the points that define the minor axis thereof are radially opposed to the fitting holes 79, each of the fitting holes 79 is arranged at a greater distance from the through hole 75B with a greater amount of structural material in the vicinity of the fitting holes 79, resulting in increased strength, than in the case where the through hole 75B is defined such that the points that define the major axis thereof are radially opposed to the fitting holes 79. Therefore, even when the radial dimension of that portion of the collar portion 52B which defines the minor axis thereof is greater than the radial dimension of that portion of the inner circumferential edge 77B defining the through hole 75B which defines the minor axis thereof, it is possible to bring the boss portion 5B into engagement with the first insulator 7B with a limited probability of a damage, such as a crack, to the areas in the vicinity of the fitting holes 79.

Furthermore, in such cases, it is also preferable that the second annular portion 74 should have the reinforcing ribs 80 each arranged on the axially upper surface thereof to extend along the length of a separate one of the fitting holes 79 (i.e., in the circumferential direction), and to extend beyond both circumferential ends of the corresponding fitting hole 79. Provision of such reinforcing ribs 80 will increase the strength of the areas in the vicinity of the fitting holes 79.

Although not shown in the accompanying drawings, the number of fitting holes 79 defined in the first insulator 7B may be only one. In this case, the sole fitting hole 79 may be defined at any circumferential position in the second annular portion 74. In this case, as described above, that portion of the inner circumferential edge 77B which is in the vicinity of the fitting hole 79 is preferably not used as a contact point in the press fitting operation.

In such a case, it is also preferable that the second annular portion 74 should have the reinforcing rib 80 arranged on the axially upper surface thereof to extend along the length of the fitting hole 79 (i.e., in the circumferential direction), and to extend beyond both circumferential ends of the fitting hole 79. Provision of the reinforcing rib 80 will increase the strength of the area in the vicinity of the fitting hole 79.

Although not shown in the accompanying drawings, the first insulator 7B may have a fitting hole 79 extending continuously across the entire circumference thereof and over the second annular portion 74 and the second cylindrical portion 73 defined therein. In this case, those portions of the inner circumferential edge 77B defining the through hole 75B which are in the vicinity of the points that define the major axis thereof are preferably not used as contact points in the press fitting operation, while those portions of the inner circumferential edge 77B defining the through hole 75B which are in the vicinity of the points that define the minor axis thereof are used as contact points in the press fitting operation, with the above-described relationship between the outer shape of the collar portion 52B and the contour of the inner circumferential edge 77B defining the through hole 75B.

In this case, it is preferable that the second annular portion 74 should have arranged on the axially upper surface thereof a single reinforcing rib 80 extending across the entire circumference of the first insulator 7B along the length of the fitting hole 79 (i.e., in the circumferential direction) or a plurality of reinforcing ribs 80 each having a specified circumferential extent. Provision of such reinforcing rib(s) 80 will increase the strength of the area in the vicinity of the fitting hole 79.

Although not shown in the accompanying drawings, the first insulator 7B may have three or more fitting holes 79 of a size substantially equivalent to that of the fitting holes 79 as illustrated in FIG. 15A defined therein such that the three or more fitting holes 79 are arranged at substantially regular intervals in the circumferential direction. In this case, the through hole 75B is defined by the inner circumferential edge 77B such that at least one of the points that define the major or minor axis of the inner circumferential edge 77B is not arranged radially opposite to any of the fitting holes 79, and that portion(s) of the inner circumferential edge 77B which are in the vicinity of the at least one point is used as contact point(s) in the press fitting operation, with the above-described relationship between the outer shape of the collar portion 52B and the contour of the inner circumferential edge 77B defining the through hole 75B. No matter how many fitting holes 79 may be defined, each of those portions of the inner circumferential edge defining the through hole which are in the vicinity of the points that define the major or minor axis thereof can be determined to be used or not used as a contact point in the press fitting operation, considering its distance from the closest fitting hole 79.

In such cases, it is also preferable that the second annular portion 74 should have the reinforcing ribs 80 each arranged on the axially upper surface thereof to extend along the length of a separate one of the fitting holes 79 (i.e., in the circumferential direction), and to extend beyond both circumferential ends of the corresponding fitting hole 79. Provision of such reinforcing ribs 80 will increase the strength of the areas in the vicinity of the fitting holes 79.

In the second preferred embodiment, the above-described variation of the second preferred embodiment, and other variations, the collar portion 52B may have a circular shape with a diameter greater than the length of the minor axis of the inner circumferential edge 77B. In this case also, a coming-off preventing mechanism to prevent the shaft 6 from coming off the bearing housing 431B is defined by a combination of the collar portion 52B and the first insulator 7B. Also note that the inner circumferential edge 77B may have a circular shape with a diameter smaller than the length of the major axis of the collar portion 52B and greater than the length of the minor axis of the collar portion 52B. In this case also, a coming-off preventing mechanism to prevent the shaft 6 from coming off the bearing housing 431B is defined by a combination of the collar portion 52B and the first insulator 7B.

Also note that the outer shape of the collar portion 52B may be defined by a curved line with a varying radius of curvature. In this case, the outer shape of the collar portion 52B is not limited to an ellipse or a circle, as long as those points in an outer edge of the collar portion 52B at which the radius of curvature thereof is smallest are arranged at diametrically opposed positions with respect to the central axis J1, and the radius of curvature thereof gradually increases with distance from those points along the outer edge of the collar portion 52B. Similarly, as is the case with the outer shape of the collar portion 52B, the inner circumferential edge 77B is not limited to an ellipse or a circle.

Note that the number, shape, length, etc., of reinforcing ribs 80 are not limited to the examples described above, but that any variety of modifications are possible with respect to the reinforcing rib(s) 80. For example, a single reinforcing rib 80 extending across the entire circumference of the first insulator 7B may be provided, or a plurality of reinforcing ribs 80 each having a smaller circumferential extent than that of the fitting hole(s) 79 may be provided. Also note that the number of fitting holes 79 may be different from the number of reinforcing ribs 80.

While preferred embodiments of the present invention have been described in detail above, it is to be appreciated that the present invention is not limited to the above-described preferred embodiments, but that a variety of variations and modifications are possible.

For example, the number of projecting portions 521 and the number of groove portions 78 are not limited to the number mentioned above. For example, as long as both the outside surface of the collar portion 52 and the inner circumferential edge 77 include a plurality of different radial dimensions, both the number of projecting portions 521 and the number of groove portions 78 may be one.

Additionally, the number of projecting portions 521 and the number of groove portions 78 may not necessarily be the same. For example, the number of groove portions 78 may be greater than the number of projecting portions 521. In this case, one or more of the groove portions 78 does not come into contact with any projecting portion 521 when the collar portion 52 is inserted into the through hole 75. However, as long as the circumferential positions of all the projecting portions 521 correspond with the circumferential position of any groove portion 78, the collar portion 52 can be inserted into inside of the through hole 75. After the insertion is complete, the collar portion 52 and the inner circumferential edge 77 can be arranged to combine to define the aforementioned coming-off preventing mechanism.

Furthermore, the number of projecting portions 521 may be greater than the number of groove portions 78. In this case, the circumferential width and position of each of the projecting portions 521 are arranged appropriately in relation to the groove portions 78 so that all the projecting portions 521 can pass through any of the groove portions 78. That is, at least one of the groove portions 78 has two or more of the projecting portions 521 pass therethrough.

Furthermore, neither the shape of the projecting portions 521 nor the shape of the groove portions 78 is limited to the one mentioned above. The shape of the outside surface of each of the projecting portions 521 and the shape of each of those portions of the inner circumferential edge 77 which are provided with the groove portions 78 as viewed in the axial direction may not necessarily be a circular arc but may be a shape including a straight line or a curved line.

Furthermore, neither the projecting portions 521 nor the groove portions 78 may necessarily be arranged at regular intervals. For example, the projecting portions 521 and the groove portions 78 may be arranged at irregular intervals in the circumferential direction, as long as the circumferential positions of the projecting portions 521 and those of the groove portions 78 can be arranged to correspond with each other when the collar portion 52 is inserted into the through hole 75.

Furthermore, each of the projecting portions 521 may not necessarily be on the same plane perpendicular or substantially perpendicular to the central axis J1. Axial positions of all the projecting portions 521 on the outside surface of the collar portion 52 may not necessarily be identical as long as, when the centrifugal fan 1 has been assembled, an axial gap is defined between an upper surface of the axially uppermost projecting portion(s) 521 and the inner circumferential edge 77 so that none of the projecting portions 521 is in contact with the inner circumferential edge 77. For example, one or more of the projecting portions 521 may be displaced from the other projecting portions 521 in the axial direction, and one or more of the projecting portions 521 may be arranged, instead of on the outside surface of the collar portion 52, on the upper surface of the collar portion 52 or on an outside surface of the columnar portion 51. Also, the projecting portions 521 may be arranged in a spiral which is continuous in the circumferential direction, while the groove portions 78 are defined in a shape corresponding to the spiral of the projecting portions 521.

Furthermore, the shape of the outside surface of the collar portion 52 or 52A and the shape of the inner circumferential edge 77 or 77A as viewed in the axial direction are not limited to the ones described above, but may be in any other desirable shape such as a polygon, a trapezoid, or the like, for example.

Furthermore, neither the outside surface of the collar portion 52 or 52A nor the inner circumferential edge 77 or 77A necessarily need to be curved. Both the outside surface of the collar portion 52 or 52A and the inner circumferential edge 77 or 77A may be so shaped as to extend along the axial direction, for example. Furthermore, only one of the outside surface of the collar portion 52 or 52A and the inner circumferential edge 77 or 77A may be curved.

Also, the fitting hole(s) 79 as used in the above-described variation of the second preferred embodiment may be provided in the first insulator 7A according to the second preferred embodiment. In this case, beneficial effects similar to those achieved by the above-described variation of the second preferred embodiment can be achieved as long as that portion of the inner circumferential edge 77 which is in the vicinity of each fitting hole 79 is not used as a contact point in the press fitting operation as in the above-described variation of the second preferred embodiment. Also, in the case where there is a desire to use that portion of the inner circumferential edge 77 which is in the vicinity of any fitting hole 79 as a contact point in the press fitting operation, even if that portion of the inner circumferential edge 77 which is in the vicinity of that fitting hole 79 is used as a contact point in the press fitting operation, beneficial effects similar to those achieved by the above-described variation of the second preferred embodiment can be achieved as long as no groove portion 78 is defined in that portion of the inner circumferential edge 77 which is in the vicinity of that fitting hole 79 as in the above-described variation of the second preferred embodiment, and in addition that portion of the inner circumferential edge 77 which is in the vicinity of that fitting hole 79 has a sufficient radial extent with a sufficient amount of structural material. In this case, as in the above-described variation of the second preferred embodiment, it is preferable that the second annular portion 74 should have the reinforcing ribs 80 each arranged on the axially upper surface thereof to extend along the length of a separate one of the fitting holes 79 (i.e., in the circumferential direction), and to extend beyond both circumferential ends of the corresponding fitting hole 79. Provision of such reinforcing ribs 80 will increase the strength of the areas in the vicinity of the fitting holes 79. In such cases, a variety of variations, modifications, and combinations are also possible with respect to the number of fitting holes 79, the position and shape of each fitting hole 79, the number of reinforcing ribs 80, the position and shape of each reinforcing rib 80, and so on.

Figure 20:
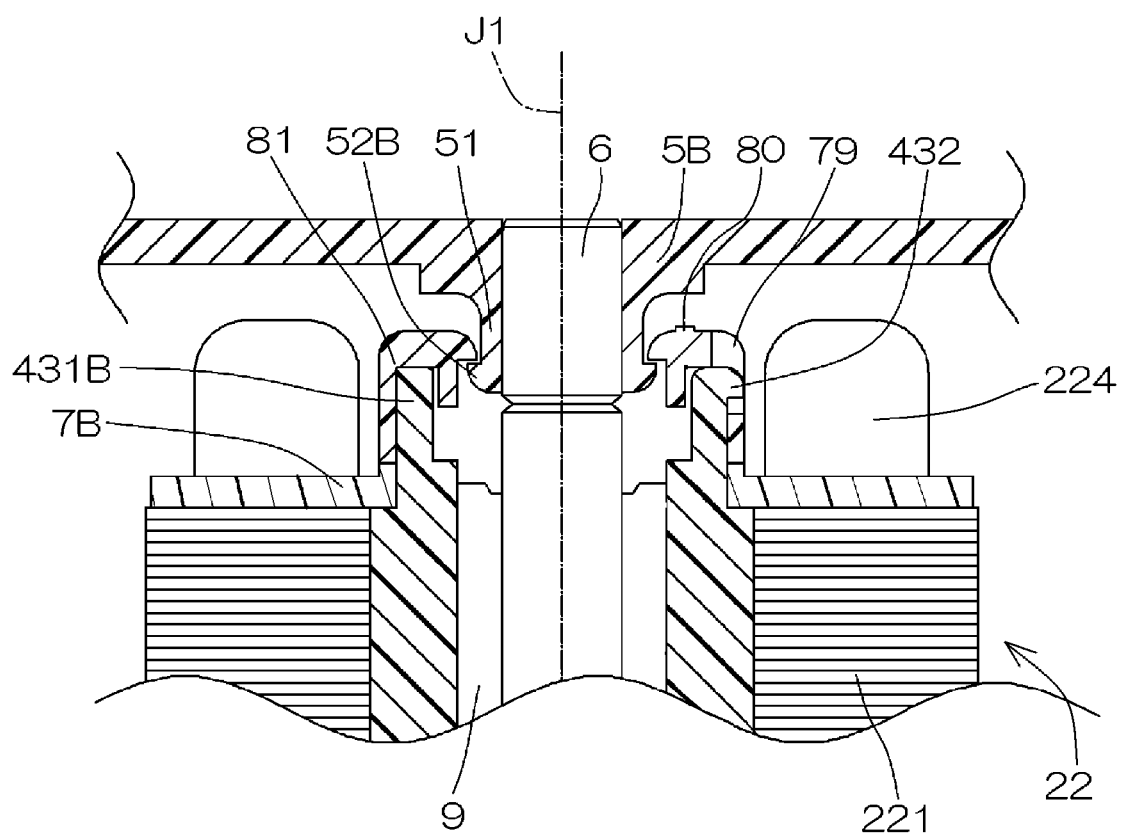
FIG. 20 is a cross-sectional view of a stator core, a bearing housing, etc., according to a variation of the second preferred embodiment of the present invention, when the stator core has been fitted into the bearing housing.

Referring to FIG. 20, in a variation of the second preferred embodiment, that portion (a coming-off preventing portion) of the first insulator 7B which combines with the collar portion 52B to define the coming-off preventing mechanism may be replaced with a coming-off preventing portion 81 separate from the remaining portion of the first insulator 7B. The same holds true of both the first insulators 7 and 7A. That is, that portion of each of the first insulators 7 and 7A which combines with the collar portion 52 or 52A to define the coming-off preventing mechanism may be replaced with a coming-off preventing portion separate from the remaining portion of the first insulator 7 or 7A.

Preferred embodiments of the present invention are applicable not only to centrifugal fans but also to other types of fans, such as, for example, axial fans. Also, preferred embodiments of the present invention are applicable to motors of a type using an insulator, and the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
a base portion;
a substantially cylindrical bearing housing extending from the base portion along an axis;
an insulator attached to an axially upper end portion of the bearing housing;
a coming-off preventing portion including a through hole and arranged axially above the insulator;
a shaft arranged to pass through the through hole to be inserted inside the bearing housing; and
a boss portion including a columnar portion and a collar portion, the columnar portion being arranged to retain one end of the shaft and inserted inside the through hole, the collar portion extending radially outward from a lower end of the columnar portion; wherein
the coming-off preventing portion includes an inner circumferential edge defining the through hole, the inner circumferential edge including at least two different radial dimensions;
the collar portion includes an outside surface including at least two different radial dimensions, and an upper surface arranged axially opposite a bottom portion of the inner circumferential edge; and
the at least two different radial dimensions of the inner circumferential edge and the at least two different radial dimensions of the collar portion are defined by radial projections and radial recesses alternatingly arranged about circumferences of each of the collar portion and the inner circumferential edge, the at least two different radial dimensions of the inner circumferential edge and the at least two different radial dimensions of the collar portion are arranged to allow the collar portion to be axially inserted through the inner circumferential edge with application of a slight force when the inner circumferential edge and the collar portion are arranged in a predetermined circumferential orientation relative to each other.

2. The motor according to claim 1, wherein
the radial recesses of the inner circumferential edge correspond to the radial projections of the collar portion; and
the collar portion is arranged to be inserted through the through hole only when circumferential positions of the radial projections correspond with those of the radial recesses.

3. The motor according to claim 2, wherein
in the collar portion, the radial projections are arranged at regular intervals in a circumferential direction; and
in the inner circumferential edge, the radial recesses are arranged at regular intervals in the circumferential direction.

4. The motor according to claim 1, wherein an outer shape of the collar portion and a shape of the inner circumferential edge are similar to each other when viewed in an axial direction.

5. The motor according to claim 1, wherein when relative rotation of the shaft with respect to the base portion stops, at least a portion of the outside surface of the collar portion axially overlaps with the inner circumferential edge.

6. The motor according to claim 1, wherein at least a portion of the inner circumferential edge is elastically deformable at least in a radial direction.

7. The motor according to claim 1, wherein the inner circumferential edge includes a curved portion with its radial dimension gradually varying in an axial direction.

8. The motor according to claim 1, wherein
the coming-off preventing portion includes a cylindrical portion and an annular portion arranged to be fitted into the axially upper end portion of the bearing housing from above.

9. The motor according to claim 8, further comprising a reinforcing rib arranged on an axially upper surface of the annular portion and in a vicinity of any of the radial recesses of the collar portion.

10. The motor according to claim 1, wherein the coming-off preventing portion is integral with the insulator.

11. A fan comprising:
the motor of claim 1;
an impeller including a plurality of blades and arranged to rotate about the axis; and
a housing arranged to contain the motor and the impeller.

12. A motor comprising:
a base portion;
a substantially cylindrical bearing housing extending from the base portion along an axis;
an insulator attached to an axially upper end portion of the bearing housing;
a coming-off preventing portion including a through hole and arranged axially above the insulator;
a shaft arranged to pass through the through hole and be inserted inside the bearing housing; and
a boss portion including a columnar portion and a collar portion, the columnar portion being arranged to retain one end of the shaft and inserted inside the through hole, the collar portion extending radially outward from a lower end of the columnar portion; wherein
the coming-off preventing portion includes an inner circumferential edge defining the through hole and being substantially in a shape of an ellipse with a major axis and a minor axis in a section taken along a plane perpendicular or substantially perpendicular to the axis;

the collar portion is substantially in a shape of an ellipse with a major axis and a minor axis in a section taken along a plane perpendicular or substantially perpendicular to the specified axis, and includes an upper surface arranged axially opposite a bottom portion of portions of the inner circumferential edge which are in a vicinity of points that define the minor axis thereof; and radial dimensions of the inner circumferential edge and radial dimensions of the collar portion are arranged to allow the collar portion to be axially inserted through the inner circumferential edge with application of a slight force when the inner circumferential edge and the collar portion are arranged in a predetermined circumferential orientation relative to each other.

13. The motor according to claim 12, wherein the minor axis of the inner circumferential edge is shorter than the minor axis of the collar portion.

14. The motor according to claim 13, wherein the coming-off preventing portion includes a cylindrical portion and an annular portion arranged to be fitted into the axially upper end portion of the bearing housing from above;

the bearing housing includes one or more fitting projections arranged at the axially upper end portion thereof; and the coming-off preventing portion includes one or more fitting holes each arranged to engage with a separate one of the one or more fitting projections of the bearing housing, the one or more fitting holes being defined in the annular portion or defined to extend over the annular portion and the cylindrical portion.

15. The motor according to claim 14, wherein the one or more fitting holes are arranged radially outward of points that define the major axis of the inner circumferential edge.

16. The motor according to claim 15, wherein the major axis of the inner circumferential edge is longer than the major axis of the collar portion.

17. The motor according to claim 12, wherein the major axis of the inner circumferential edge is shorter than the major axis of the collar portion.

18. The motor according to claim 17, wherein the coming-off preventing portion includes a cylindrical portion and an annular portion arranged to be fitted into the axially upper end portion of the bearing housing from above;

the bearing housing includes one or more fitting projections arranged at the axially upper end portion thereof; and the coming-off preventing portion includes one or more fitting holes each arranged to engage with a separate one of the one or more fitting projections of the bearing housing, the one or more fitting holes being defined in the annular portion or defined to extend over the annular portion and the cylindrical portion.

19. The motor according to claim 18, wherein the one or more fitting holes are arranged radially outward of points that define the minor axis of the inner circumferential edge.

20. The motor according to claim 19, wherein the minor axis of the inner circumferential edge is longer than the minor axis of the collar portion.

\* \* \* \* \*